US009813606B2

(12) United States Patent
Satoh

(10) Patent No.: US 9,813,606 B2
(45) Date of Patent: Nov. 7, 2017

(54) IMAGE FORMING APPARATUS, IMAGE FORMING METHOD, AND IMAGE FORMING SYSTEM

(71) Applicant: Mitsuru Satoh, Tokyo (JP)

(72) Inventor: Mitsuru Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/176,797

(22) Filed: Jun. 8, 2016

(65) Prior Publication Data
US 2016/0381277 A1 Dec. 29, 2016

(30) Foreign Application Priority Data

Jun. 23, 2015 (JP) .................... 2015-125782

(51) Int. Cl.
G06F 3/12 (2006.01)
H04N 5/232 (2006.01)
H04L 12/46 (2006.01)

(52) U.S. Cl.
CPC ..... H04N 5/23206 (2013.01); H04L 12/4641 (2013.01)

(58) Field of Classification Search
None
See application file for complete search history.

(56) References Cited

U.S. PATENT DOCUMENTS

| 6,594,023 | B1 | 7/2003 | Omura et al. | |
|---|---|---|---|---|
| 8,368,740 | B2 * | 2/2013 | Otake | H04L 63/102 |
| | | | | 348/14.08 |
| 8,687,217 | B2 * | 4/2014 | Jung | G06F 3/1209 |
| | | | | 358/1.15 |
| 9,042,940 | B2 * | 5/2015 | Suzuki | H04W 88/06 |
| | | | | 358/1.15 |
| 2002/0145595 | A1 | 10/2002 | Satoh | |
| 2003/0206306 | A1 | 11/2003 | Omura et al. | |
| 2004/0027397 | A1 | 2/2004 | Satoh | |
| 2005/0264541 | A1 | 12/2005 | Satoh | |
| 2007/0174515 | A1 * | 7/2007 | Sinclair | H04M 1/7253 |
| | | | | 710/62 |
| 2007/0264988 | A1 * | 11/2007 | Wilson, Jr. | H04L 12/1813 |
| | | | | 455/416 |
| 2008/0225331 | A1 * | 9/2008 | Jung | G06F 3/1209 |
| | | | | 358/1.15 |

(Continued)

FOREIGN PATENT DOCUMENTS

| JP | 2005-064552 | 3/2005 |
|---|---|---|
| JP | 2005-151340 | 6/2005 |

(Continued)

*Primary Examiner* — Dung Tran

(74) *Attorney, Agent, or Firm* — Harness, Dickey, & Pierce P.L.C.

(57) ABSTRACT

An image forming apparatus includes circuitry that connects to one or more first information processing apparatuses via a virtual private network in response to a request to connect from at least one of the one or more first information processing apparatuses and establishes a first wireless communication network among the image forming apparatus and the first information processing apparatuses to enable wireless communication among the image forming apparatus and the first information processing apparatuses.

19 Claims, 16 Drawing Sheets

(56) References Cited

U.S. PATENT DOCUMENTS

| | | | | |
|---|---|---|---|---|
| 2009/0052467 A1* | 2/2009 | Kaidar | ................ | H04W 12/08 |
| | | | | 370/469 |
| 2010/0110161 A1* | 5/2010 | Wilson, Jr. | .......... | H04L 12/1813 |
| | | | | 348/14.09 |
| 2014/0358681 A1 | 12/2014 | Satoh | | |
| 2014/0368882 A1* | 12/2014 | Park | ..................... | G06F 3/1296 |
| | | | | 358/1.15 |

FOREIGN PATENT DOCUMENTS

| | | |
|---|---|---|
| JP | 2008-312017 | 12/2008 |
| JP | 2011-522332 | 7/2011 |
| WO | WO2009/146544 A1 | 12/2009 |

\* cited by examiner

FIG. 5

APPARATUS ID
APPARATUS NAME
APPARATUS TYPE
APPARATUS ADDRESS
PASSWORD
PAYMENT INFORMATION
FIRST IDENTIFIER
SECOND IDENTIFIER
THIRD IDENTIFIER
. . .

FIG. 6

MFP ID
MFP NAME
MFP IP ADDRESS
INSTALLATION AREA CODE
INSTALLATION ENVIRONMENT CODE
OPTION INFORMATION
APPARATUS ADDRESS
FIRST IDENTIFIER
SECOND IDENTIFIER
THIRD IDENTIFIER
. . .

FIG. 7

SELECT MFP TO BE CONNECTED

AAA_MFP
BBB_MFP
CCC_MFP
DDD_MFP
EEE_MFP
   . . .

[CONNECT] [CANCEL]

FIG. 8

CONNECTED APPARATUS INFORMATION

APPARATUS ID
APPARATUS NAME
APPARATUS TYPE
APPARATUS ADDRESS
FIRST IDENTIFIER
SECOND IDENTIFIER
THIRD IDENTIFIER
. . .

FIG. 10

ESTABLISH NEW PAN

PAN NAME

XXXXX CONFERENCE "AA"

| IDENTIFIER | NAME |
|---|---|
| AA/BB/CC | DDDDDD |
| EE/FF/GG | HHHHHH |
| II/JJ/KK | LLLLLL |
| OO/PP/QQ | RRRRRR |
| . . . | |

| NAME |
|---|
| DDDDDD |
| LLLLLL |
| RRRRRR |
| . . . |

ADD          DELETE

OK     CANCEL

FIG. 11

CONFIRM PARTICIPATION IN PAN

PAN NAME

XXXXX CONFERENCE "AA"

ORGANIZER NAME

DDDDDD

PARTICIPATE IN PAN?

YES     NO

FIG. 16

INTEGRATE PAN

INTEGRATED PAN NAME

XXXXX CONFERENCE

XXXXX CONFERENCE    [SEARCH]

PAN NAME
XXXXX CONFERENCE "BB"
XXXXX CONFERENCE "CC"
XXXXX CONFERENCE "DD"
XXXXX CONFERENCE "EE"
. . .

PAN NAME
XXXXX CONFERENCE "CC"
XXXXX CONFERENCE "DD"
XXXXX CONFERENCE "EE"
. . .

[ADD]    [DELETE]

[OK]    [CANCEL]

FIG. 17

CONFIRM PAN INTEGRATION

INTEGRATED PAN NAME

XXXXX CONFERENCE

INTEGRATED ORGANIZER NAME

DDDDDD

INTEGRATE PAN?

[YES]    [NO]

FIG. 18

INTEGRATED PAN INFORMATION

INTEGRATED PAN ID
INTEGRATED PAN NAME
MASTER APPARATUS ID
INTEGRATED PAN INFORMATION
  PAN ID
  PAN ID
  . . .
. . .

IMAGE FORMING APPARATUS, IMAGE FORMING METHOD, AND IMAGE FORMING SYSTEM

CROSS-REFERENCE TO RELATED APPLICATIONS

This patent application is based on and claims priority pursuant to 35 U.S.C. §119(a) to Japanese Patent Application No. 2015-125782, filed on Jun. 23, 2015 in the Japan Patent Office, the entire disclosures of which are hereby incorporated by reference herein.

BACKGROUND

Technical Field

The present invention relates to an image forming apparatus, an image forming method, and an image forming system.

Background Art

At conferences in corporations etc., it is tried to reduce paper resources and enhance productivity of the conferences by displaying conference materials on apparatuses used by conference attendees to share the conference materials. To achieve the goal, it is necessary that the apparatuses be connected to be communicable with one another. However, if the apparatuses are connected to a Local Area Network (LAN) of the intranet, attendees who are outsiders can access confidential data of the corporation in some cases, lowering the security level.

SUMMARY

Example embodiments of the present invention provide a novel image forming apparatus that includes circuitry that connects to one or more first information processing apparatuses via a virtual private network in response to a request to connect from at least one of the one or more first information processing apparatuses and establishes a first wireless communication network among the image forming apparatus and the first information processing apparatuses to enable wireless communication among the image forming apparatus and the first information processing apparatuses.

Further embodiments of the present invention provide an image forming method, and an image forming system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating apparatus information of a client apparatus stored in a network management server as an embodiment of the present invention.

FIG. 6 is a diagram illustrating multifunction peripheral (MFP) information of stored in a network management server as an embodiment of the present invention.

FIG. 7 is a diagram illustrating a screen of selecting an image forming apparatus as an embodiment of the present invention.

FIG. 8 is a diagram illustrating information on a connected apparatus stored in a connected apparatus information storage unit as an embodiment of the present invention.

FIG. 10 is a diagram illustrating a screen of establishing the new PAN as an embodiment of the present invention.

FIG. 11 is a diagram illustrating a screen of confirming participation in the PAN as an embodiment of the present invention.

FIG. 16 is a diagram illustrating a screen of integrating PANs as an embodiment of the present invention.

FIG. 17 is a diagram illustrating a screen of confirming integration of PANs as an embodiment of the present invention.

FIG. 18 is a diagram illustrating integrated PAN information generated by an integrated PAN manager as an embodiment of the present invention.

Figure 1:
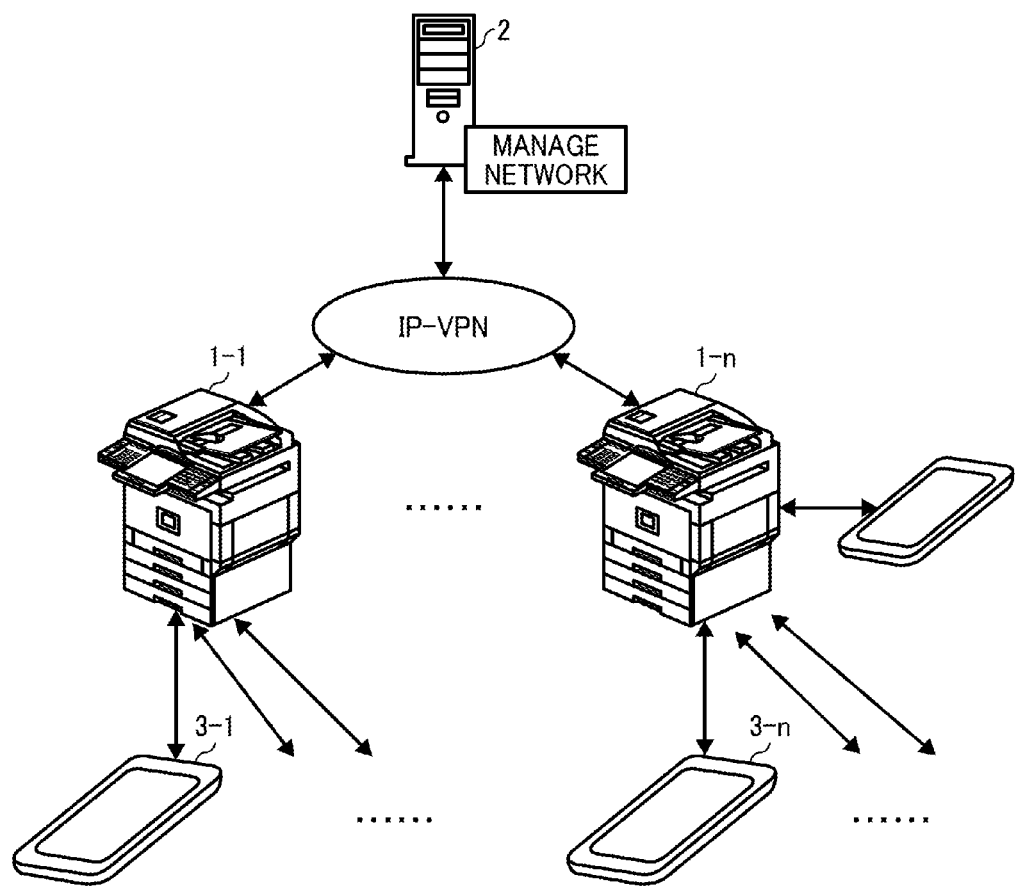
FIG. 1 is a diagram illustrating a network system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the embodiment described below, a network system that shares data such as conference materials among apparatuses used by conference attendees using image forming apparatuses located at an office is described as an example.

FIG. 1 is a diagram illustrating a network system in this embodiment. As shown in FIG. 1, in the network system in this embodiment, image forming apparatuses 1-1 to 1-n (i.e., the number of image forming apparatuses is n) are connected to a network management server 2 via an Internet Protocol Virtual Private Network (IP-VPN). As the image forming apparatus 1-n in FIG. 1, the image forming apparatuses 1-1 to 1-n and mobile information processing terminals such as tablet devices may together form an image forming system, while the mobile information processing terminal operating as a control panel for the corresponding image forming apparatus. That is, the control panel accepts user operation on the image forming apparatus.

In addition, in the network system in this embodiment, client apparatuses 3-1 to 3-n (i.e., the number of client apparatuses is n) can be connected to any one of the image forming apparatuses 1-1 to 1-n via a WiFi-VPN. In this embodiment, a Personal Area Network (PAN) is constructed using some of the client apparatuses 3-1 to 3-n connected to any one of the image forming apparatuses 1-1 to 1-n.

Here, n is an integer equal to or larger than 1. However, n of the image forming apparatuses 1-1 to 1-n is not always the same value as n of the client apparatus 3-1 to 3-n. In some cases, the image forming apparatus 1 collectively means the image forming apparatuses 1-1 to 1-n, and the client apparatus 3 means the client apparatus 3-1 to 3-n in the description below.

The image forming apparatus 1 is a MFP, located at an office in this embodiment, implements an image capturing capability, image forming capability, and communication capability and can be used as a printer, facsimile, scanner, and copier.

The network management server 2 manages various statuses of the image forming apparatus 1. The network management server 2 in this embodiment stores information that indicates a connecting status of the image forming apparatus 1 and the client apparatus 3 and a construction status of the PAN etc. in the network system and transfers the stored information in accordance with a request from the image forming apparatus 1.

The client apparatus 3 is an information processing apparatus used by a conference attendee such as a tablet device, a generic personal computer (PC), a projector, an electronic whiteboard, and a videoconference apparatus etc. Each client apparatus 3 stores information of the client apparatus 3 (hereinafter referred to as "apparatus information") in the network management server 2 via a web page etc. provided by the network management server 2. Among the client apparatuses 3 registered in the network management server 2, the PAN is constructed by selecting client apparatuses 3 connected to be communicable with each other at a conference.

Figure 2:
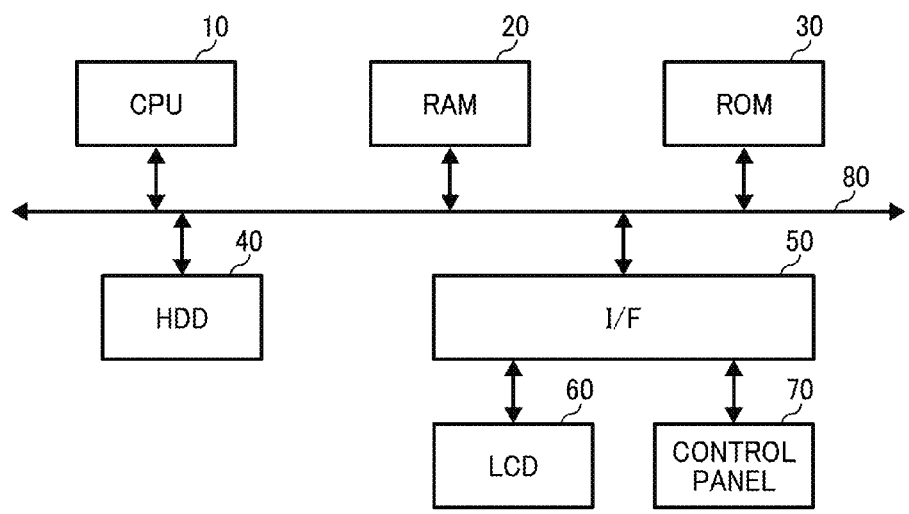
FIG. 2 is a block diagram illustrating a hardware configuration of an information processing apparatus as an embodiment of the present invention.

Next, a hardware configuration of information processing apparatuses such as the image forming apparatus 1, the network management server 2, and the client apparatus 3 etc. in this embodiment is described below. FIG. 2 is a block diagram illustrating a hardware configuration of an information processing apparatus such as the image forming apparatus 1, the network management server 2, and the client apparatus 3 etc. It should be noted that the image forming apparatus 1 includes an engine to implement a scanner and printer etc. in addition to the hardware configuration shown in FIG. 2.

As shown in FIG. 2, the information processing apparatus in this embodiment includes the same configuration as a general server or personal computer (PC) etc. The information processing apparatus in this embodiment includes a Central Processing Unit (CPU) 10, a Random Access Memory (RAM) 20, a Read Only Memory (ROM) 30, a hard disk drive (HDD) 40, and an interface (I/F) 50, which are connected with each other via a bus 80. In addition, a Liquid Crystal Display (LCD) 60 and a control panel 70 are connected to the I/F 50.

The CPU 10 is a processor and controls the whole operation of the information processing apparatus. The RAM 20 is a volatile memory that can read/write information at high speed and is used as a work area when the CPU 10 processes information. The ROM 30 is a read-only non-volatile storage medium and stores programs such as firmware. The HDD is a non-volatile storage medium that can read/write information and stores the OS, various control programs, and application programs etc. In addition to the HDD, semiconductor memories such as a Solid State Drive (SSD) can be used.

The I/F 50 connects the bus 80 with various hardware and network etc. to control such hardware and network. The LCD 60 is a visual user interface to check status of the information processing apparatus. The operational unit 70 is a user interface such as a keyboard and mouse etc. to input information to the information processing apparatus. In the network management server 2 in this embodiment, user interfaces such as the LCD 60 and the control panel 70 etc. can be omitted since the network management server 2 is operated as a server without direct user operation. Regarding the client apparatuses 3 in this embodiment, the LCD 60 can be omitted for apparatuses without display screens such as the projector etc.

In this hardware configuration described above, the CPU 10 executes operation in accordance with programs stored in the ROM 30 and programs loaded from storage devices such as HDD 40, and optical discs into the RAM 20, to operate as a software controller. Functional blocks that implement capabilities of the image forming apparatus 1, the network management server 2, and the client apparatus 3 of this embodiment are constructed by a combination of the software controller described above and hardware.

Figure 3:
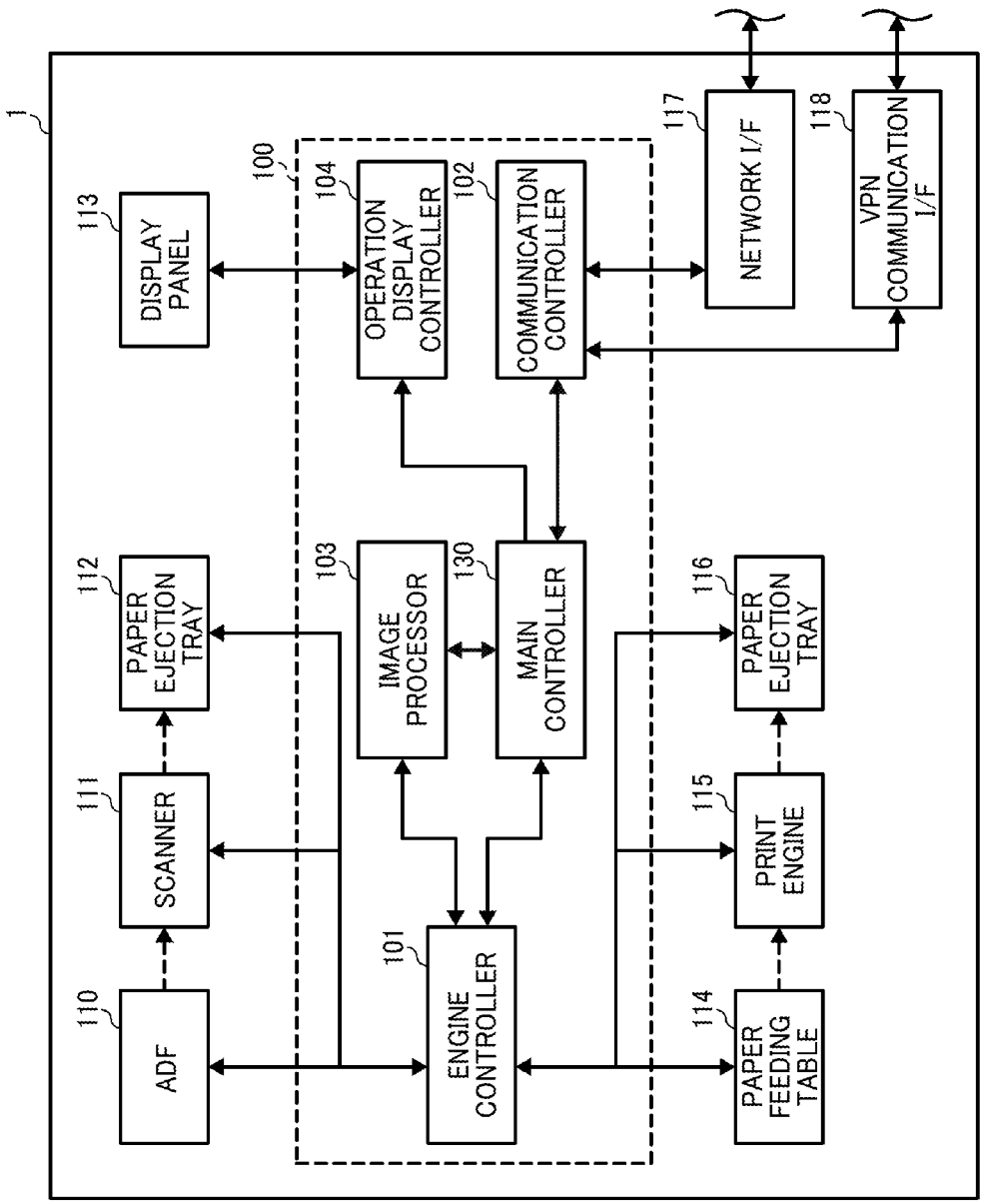
FIG. 3 is a block diagram illustrating a functional configuration of the image forming apparatus as an embodiment of the present invention.

Next, a functional configuration of the software controller of the image forming apparatus 1 is described below. FIG. 3 is a block diagram illustrating a functional configuration of the software controller that cooperates with hardware of the image forming apparatus 1 in this embodiment. As shown in FIG. 3, the image forming apparatus 1 includes a controller 100, an Auto Document Feeder (ADF) 110, a scanner 111, a paper ejection tray (paper output tray) 112, a display panel 113, a paper feeding table (paper feed table) 114, a print engine 115, a paper ejection tray 116, a network I/F 117, and a VPN communication I/F 118.

The controller 100 includes a main controller 130, an engine controller 101, a communication controller 102, an image processor 103, and an operation display controller 104. As shown in FIG. 3, the image forming apparatus 1 in this embodiment is constructed as the MFP that includes the scanner 111 and the print engine 115. In FIG. 3, solid arrows indicate electrical connections, and dashed arrows indicate flow of paper.

The display panel 113 operates as an output interface that displays status of the image forming apparatus 1 and an input interface (operational unit) to allow a user to directly operate the image forming apparatus 1 or input information to the image forming apparatus 1. As described above, if the control panel is the tablet device etc. separated from the image forming apparatus 1, the display unit of the tablet device can function as the display panel 113.

The network I/F 117 is an interface that the image forming apparatus 1 communicates with other apparatuses via the network. Interfaces such as Ethernet, Bluetooth, and Wireless Fidelity (Wi-Fi) can be used as the network I/F 117. The VPN communication I/F 118 is an interface that the image forming apparatus 1 communicates with other apparatuses using VPN communication. The network I/F 117 and the VPN communication I/F 118 are implemented by the I/F 50 in FIG. 2.

The controller 100 is implemented by a combination of software and hardware. More specifically, control programs such as firmware stored in a non-volatile storage medium e.g., the ROM 30 and HDD 40 etc. and image processing programs are loaded into the RAM 20. That is, the controller 100 corresponds to a software controller implemented by performing calculation by the CPU 10 in accordance with those programs and hardware such as integrated circuits etc. The controller 100 functions as a controller that controls the whole part of the image forming apparatus 1.

The main controller 130 controls each unit included in the controller 100 and commands each unit in the controller 100. In addition, the main controller 130 in this embodiment includes a function that constructs PAN including the client apparatuses 3 selected by a conference organizer etc. and a processing function in the conference that the client apparatuses 3 included in the PAN are used. The function of constructing PAN and processing function in the conference by the main controller 130 are described in detail later.

The engine controller 101 controls and drives the print engine 115 and the scanner 111. The communication controller 102 inputs signals and commands input from the information processing apparatuses connected to the image forming apparatus 1 via the network I/F 117 and the VPN communication I/F 118 into the main controller 130. In addition, the main controller 130 controls the communication controller 102 and accesses other apparatuses via the network I/F 117 and the VPN communication I/F 118.

The image processor 103 generates drawing information based on image information to be printed and output under the control of the main controller 130. The drawing information is information that the print engine 115 as an image forming unit draws as an image to be formed in an image forming operation. The image processor 103 processes image pickup data input from the scanner unit 111 and generates image data. The generated image data is stored in the image forming apparatus 1 as a result of the scanner operation or transferred to another apparatus via the network I/F 117. The operation display controller 104 displays information on the display panel 113 and reports information input via the display panel to the main controller 130.

In case of the image forming apparatus that only includes a printing function, the ADF 110, the scanner 111, and the sheet ejection tray (paper output tray) 112 are omitted. Along with that, a function that controls the scanner unit 111 and the paper output tray 112 is omitted from functions included in the engine controller 101.

If the image forming apparatus 1 functions as a printer, first, the communication controller 102 receives a print job from the client apparatus 3 etc. via the network I/F 117 and the VPN communication I/F 118. The communication controller 102 transfers the received print job to the main controller 130. After receiving the print job, the main controller 130 generates the drawing information based on the document information and image information included in the print job by controlling the image processor 103.

After the image processor 103 generates the drawing information, the engine controller 101 executes forming an image on paper as a recording medium carried from the paper feed table 114 based on the generated drawing information. For example, in addition to the sheet described above, sheet-shaped materials such as a film and a plastic on which an image is formed can be adopted as the recording medium. As particular examples of the print engine 115, image forming mechanisms such as inkjet method and electrophotography method can be used. After the print engine 115 forms the image on the paper, the paper is ejected on the paper output tray 116.

If the image forming apparatus 1 functions as a scanner, the operation display controller 104 or the communication controller 102 transfers a signal for scanning to the main controller 130 in accordance with a command to scan. The command to scan is input by operating the display panel 113 by user operation or input from an external apparatus via the network I/F 117 or the VPN communication I/F 118. The main controller 130 controls the engine controller 101 based on the received signal to execute scanning.

The engine controller 101 drives the ADF 110 and carries a document to be scanned set on the ADF 110 to the scanner 111. In addition, the engine controller 101 drives the scanner unit 111 and scans the document carried from the ADF 110. If the document is not set on the ADF 110 and the document is set on the scanner 111 directly, the scanner 111 scans the set document under the control of the engine controller 101. That is, the scanner 111 functions as the image pickup unit.

In scanning operation, an image pickup device such as CCD included in the scanner 111 optically scans the document, and image pickup information is generated based on the optical information. The engine controller 101 transfers the image pickup information generated by the scanner 111 to the image processor 103.

The image processor 103 generates the image information based on the image pickup information received from the engine controller 101 under the control of the main controller 130. The image information generated by the image processor 103 is stored in the storage device such as the HDD 40 attached to the image processing apparatus 1. The image information generated by the image processor 103 is either stored in the HDD 40 etc. as is or transferred to an external apparatus by the communication controller 102 via the network OF 117 or the VPN communication I/F 118 depending on the user command.

If the image forming apparatus 1 functions as a copier, the image processor 103 generates the drawing information based on either the image pickup information received from the scanner 111 by the engine controller 101 or the image information generated by the image processor 103. Similarly as the printer operation, the engine controller 101 drives the print engine 115 based on the drawing information.

Figure 4:
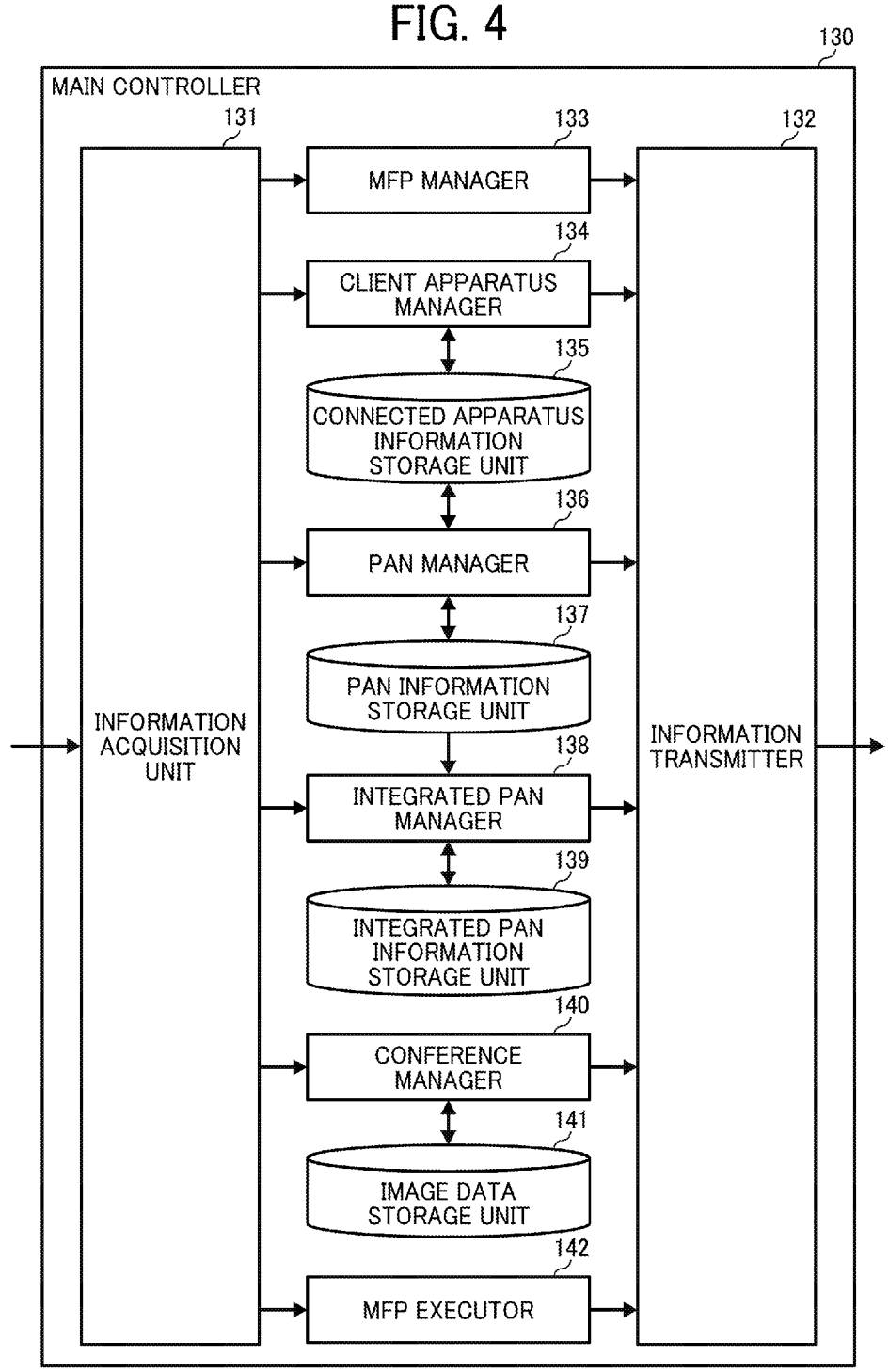
FIG. 4 is a block diagram illustrating a functional configuration of a main controller as an embodiment of the present invention.

An operation of constructing the PAN and an operation in the conference described above among capabilities of the main controller 130 in this embodiment are described below. FIG. 4 is a block diagram illustrating a functional configuration of the main controller 130 in this embodiment. As shown in FIG. 4, the main controller 130 in this embodiment includes an information acquisition unit 131, an information transmitter 132, a MFP manager 133, a client apparatus manager 134, a connected apparatus information storage unit 135, a PAN manager 136, a PAN information storage unit 137, an integrated PAN manager 138, an integrated PAN information storage unit 139, a conference manger 140, an image data storage unit 141, and a MFP executor 142.

As an assumption of the PAN configuration by the main controller 130 in this embodiment, each client apparatus 3 stores the apparatus information of the client apparatus 3 in the network management server 2 via a web page etc. provided by the network management server 2. FIG. 5 is a diagram illustrating the apparatus information of the client apparatus 3 stored in the network management server 2 in this embodiment.

As shown in FIG. 5, the apparatus information includes information such as "apparatus ID", "apparatus name", "apparatus type", "apparatus address", "password", "payment information", "first identifier", "second identifier", and "third identifier" etc. The apparatus ID is an identifier to identify the client apparatus 3. The apparatus name is a name of the client apparatus 3 or user name who uses the client apparatus 3 in this embodiment.

The apparatus type is information indicating a type of the client apparatus 3 such as a tablet device, PC, projector, electronic whiteboard, and videoconference apparatus etc. The apparatus address is an address that is used in transferring information to the client apparatus 3 such that a user mail address who uses the client apparatus 3 in this embodiment. The password is a password that is used in authenticating the client apparatus 3. The payment information is a method of payment in charging a fee by the image forming apparatus 1 such that it indicates a credit card or a direct debit. In case of the credit card, the payment information includes a card number. In case of the direct debit, the payment information includes an account number.

The first identifier, the second identifier, and the third identifier are information that is used in searching for the client apparatus 3. In this embodiment, a search range of the first identifier is the widest, and a search range of the third identifier is the narrowest. More specifically, for example, the first identifier is a corporation name of a corporation where a user of the client apparatus 3 works, the second identifier is a division name of a division in the corporation indicated by the first identifier that the user belongs to, and the third identifier is a department name of the division indicated by the second identifier.

Now, the description goes back to FIG. 4. The information acquisition unit 131 acquires information from the controller 100. The information transmitter 132 transfers information to the controller 100. The MFP manager 133 outputs information for displaying a registration screen of the image forming apparatus 1 (MFP) to the operation display controller 104 via the information transmitter 132. As a result, the registration screen of the image forming apparatus 1 is displayed on the display panel 113.

Next, the MFP manager 133 stores the information of the image forming apparatus 1 input via the registration screen of the image forming apparatus 1 displayed on the display panel 113 (hereinafter referred to as "MFP information") in the network management server 2. FIG. 6 is a diagram illustrating the MFP information stored in the network management server 2 in this embodiment.

As shown in FIG. 6, the MFP information includes information such as "MFP ID", "MFP name", "MFP IP address", "installation area code", "installation environment code", "option information", "apparatus address", "first identifier", "second identifier", and "third identifier" etc. The MFP ID is an identifier to identify the image forming apparatus 1. The MFP name is a name of the image forming apparatus 1. The MFP IP address is information indicating IP address of the image forming apparatus 1.

The installation area code is information indicating an area where the image forming apparatus 1 is located (such as Yokohama and Shibuya etc.). The installation environment code is information indicating a location where the image forming apparatus is located (such as conference room, reception, and convenience store etc.). The option information is information indicating optional devices attached to the image forming apparatus 1 (such as staple machine, binding machine, and finisher etc.). The apparatus address is a mail address configured in the image forming apparatus 1.

The first identifier, the second identifier, and the third identifier are information that is used in searching for the image forming apparatus 1. In this embodiment, a search range of the first identifier is the widest, a search range of the second identifier is narrower than the first identifier and wider than the third identifier, and a search range of the third identifier is the narrowest. More specifically, for example, the first identifier is a corporation name where the image forming apparatus 1 is located and the search range of the first identifier is the widest, the second identifier is a division name in the corporation indicated by the first identifier and the search range of the second identifier is narrower than the first identifier and wider than the third identifier, and the third identifier is a department name in the division indicated by the second identifier and the search range of the third identifier is the narrowest.

The client apparatus manager 134 manages the client apparatus 3 connected to the image forming apparatus 1 itself among the client apparatuses 3 whose apparatus information is stored in the network management server 2. More specifically, after detecting the client apparatus 3 capable of communicating in ad-hoc mode, the client apparatus manager 134 transfers communication information (e.g., Extended Service Set Identifier (ESSID) etc.), which is used to establish communication in ad-hoc mode, to the client apparatus 3. In ad-hoc mode, the network is decentralized and does not rely on a preexisting infrastructure, such as routers in wired networks or access points in managed (infrastructure) wireless networks. Instead, each node participates in routing by forwarding data for other nodes, so the determination of which nodes forward data is made dynamically on the basis of network connectivity.

After receiving the communication information, the client apparatus 3 establishes communication with the image forming apparatus 1 in infrastructure mode via an access point stored in the image forming apparatus 1 using the received communication information. In infrastructure mode, the network is centralized and relies on a preexisting infrastructure, such as routers in wired networks or access points in managed wireless networks. Here, in case of connecting the client apparatus 3 to the image forming apparatus 1 via WiFi-VPN, a connection menu with the image forming apparatus 1 is selected on a menu screen of a dedicated application installed in the client apparatus 3 by user operation.

After selecting the connection menu, the client apparatus 3 transfers authentication information of the client apparatus 3 to the image forming apparatus 1 that establishes communication with the client apparatus 3 in infrastructure mode. Examples of the authentication information are the apparatus ID, apparatus address, and password etc. of the client apparatus 3 shown in FIG. 5. After receiving the authentication information, the client apparatus manager 134 transfers the authentication information to the network management server 2 to request the network management server 2 to authenticate the client apparatus 3.

If the received authentication information corresponds to information included in the stored apparatus information of the client apparatus 3, the network management server 2 reports to the image forming apparatus 1 that it is succeeded to authenticate the client apparatus 3. The client apparatus manager 134 reports the authentication result to the client apparatus 3. The image forming apparatus 1 that reported the authentication result indicating that the authentication succeeded can be connected to the client apparatus 3.

FIG. 7 is a diagram illustrating a screen of selecting the image forming apparatus 1 to be connected using WiFi-VPN displayed on the LCD 60 of the client apparatus 3 (hereinafter referred to as "connected MFP selection screen"). As shown in FIG. 7, in the connected MFP selection screen, a list of MFP names of the image forming apparatuses 1 connectible using WiFi-VPN is displayed.

On the connected MFP selection screen shown in FIG. 7, the image forming apparatus 1 connected using WiFi-VPN is selected, and a connect button is pressed by user operation. The content of user operation and the apparatus information of the client apparatus 3 on which user operation is performed is input into the information acquisition unit 131 via the communication controller 102 of the selected image forming apparatus 1. As a result, the client apparatus manager 134 in the selected image forming apparatus 1 establishes communication connection with the client apparatus 3 that requested to connect using WiFi-VPN.

That is, the client apparatus manager 134 functions as a communication connection processor that connects to the client apparatus 3 to be communicable via VPN. In addition, the client apparatus manager 134 stores the apparatus information of the client apparatus 3 that establishes the communication connection in the connected apparatus information storage unit 135.

In addition, the client apparatus manager 134 transfers a request for response at a predetermined interval to the client apparatus 3 that the WiFi-VPN connection is established. If there is no response to the request for response from the client apparatus 3, the client apparatus manager 134 determines that the client apparatus 3 does not exist within an area connectible to the image forming apparatus 1 anymore and disconnects the communication with the client apparatus 3.

The connected apparatus information storage unit 135 stores the apparatus information of the client apparatus 3 connected to the image forming apparatus 1. FIG. 8 is a diagram illustrating information on a connected apparatus stored in a connected apparatus information storage unit 135 in this embodiment. As shown in FIG. 8, in the connected apparatus information storage unit 135, the apparatus information of all client apparatuses 3 connected to the image forming apparatus 1 is stored. The apparatus information stored in the connected apparatus information storage unit 135 can be a part of information required in an operation by the PAN manager 136 (described later) among the apparatus information shown in FIG. 5.

The PAN manager 136 manages a PAN constructed by the client apparatuses 3 connected to the image forming apparatus 1 in accordance with a request from the client apparatus 3. More specifically, the PAN manager 136 constructs a new PAN, adds the client apparatus 3 to the constructed PAN, deletes the client apparatus 3 from the constructed PAN, and releases the constructed PAN.

Figure 9:
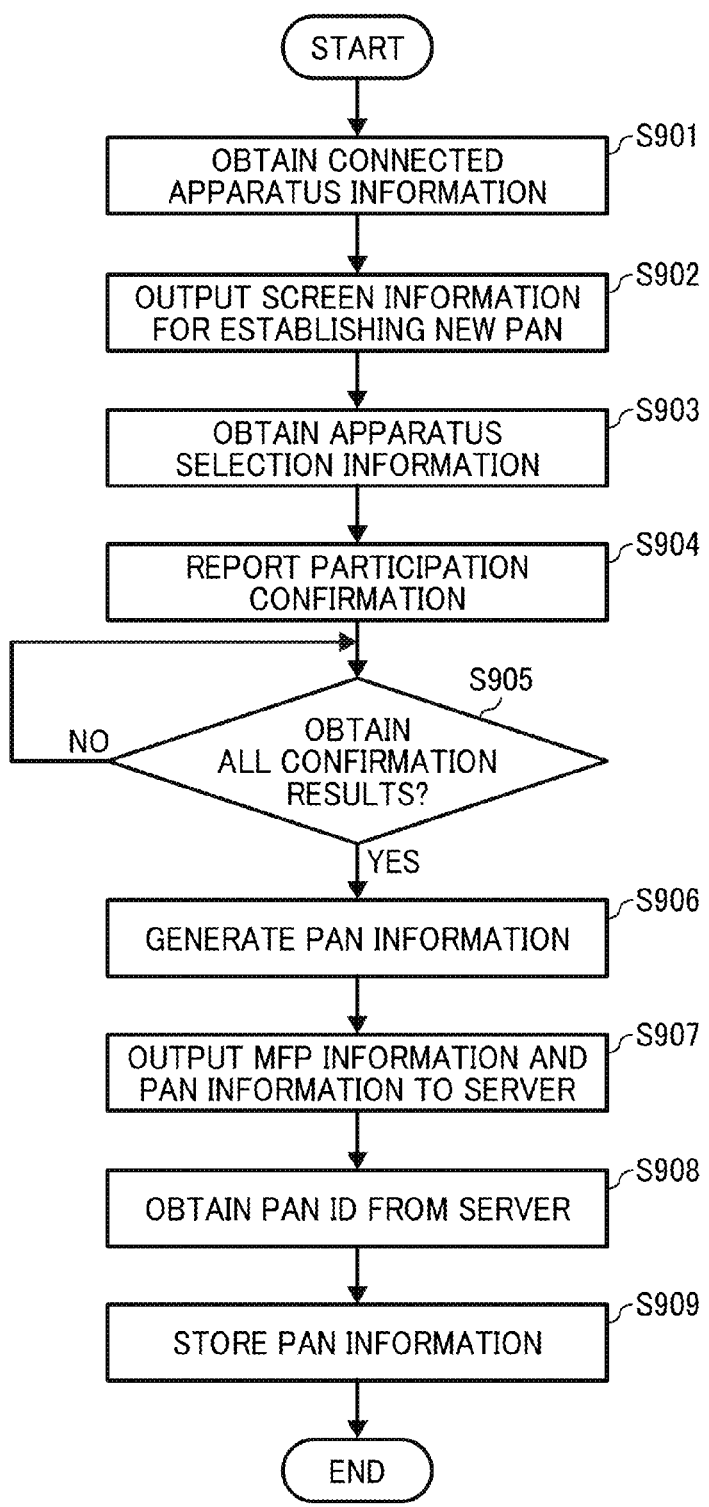
FIG. 9 is a flowchart illustrating an operation of establishing a new personal area network (PAN) as an embodiment of the present invention.

FIG. 9 is a flowchart illustrating an operation of establishing a new PAN in this embodiment. An operation of constructing a new PAN starts after selecting a menu of constructing a new PAN from a menu screen of a dedicated application installed in the client apparatus 3 by user operation. For example, the selection of the menu of constructing the new PAN is performed on the client apparatus 3 used by an organizer of the conference that the PAN is used (hereinafter referred to as "main client apparatus 3").

As shown in FIG. 9, the PAN manager 136 obtains the connected apparatus information stored in the connected apparatus information storage unit 135 in S901. After obtaining the connected apparatus information, the PAN manager 136 generates information for displaying a new PAN construction screen based on the obtained connected apparatus information and outputs the information to the main client apparatus 3 in S902. As a result, the new PAN construction screen is displayed on the LCD 60 of the main client apparatus 3.

FIG. 10 is a diagram illustrating a screen of establishing the new PAN in this embodiment. As shown in FIG. 10, in the new PAN construction screen, a text box to input a name of the PAN to be constructed, a list of apparatus information of the selectable client apparatuses 3, and a list of names of the selected client apparatuses 3 are included. For example, the apparatus information of the selectable client apparatus 3 is information from the first identifier to the third identifier and information on the apparatus name among apparatus information included in the connected apparatus information obtained in S901. As shown in FIG. 10, for example, the client apparatus 3 whose first identifier is "AA", second identifier is "BB", third identifier is "CC", and apparatus name is "DDDDDD" is displayed as "AA/BB/CC DDDDDD".

After selecting apparatus information among the list of apparatus information of the selectable client apparatus 3, "add" button is pressed by user operation of the main client apparatus 3. As a result, the apparatus name of the selected client apparatus 3 is added to a list of selected apparatus names. In case of selecting an apparatus name among the list of apparatus names of selected client apparatus 3 and pressing "delete" button by user operation of the main client apparatus 3, the apparatus name of the selected client apparatus 3 is deleted from the list of selected apparatus names.

After finishing selecting the client apparatus 3, the OK button is pressed by user operation of the main client apparatus 3. As a result, the apparatus information of the client apparatus 3 included in the list of apparatus names of selected client apparatus 3 is input into the information acquisition unit 131 as the apparatus selection information via the operation display controller 104 of the image forming apparatus 1.

Consequently, the PAN manager 136 obtains the apparatus selection information in S903. After obtaining the apparatus selection information, the PAN manager 136 notifies the client apparatus 3 indicated by the apparatus information included in the obtained apparatus selection information of confirmation of joining PAN in S904. FIG. 11 is a diagram illustrating a screen of confirming participation in PAN displayed on the LCD 60 of the client apparatus 3 that the confirmation of joining PAN is notified in S904 in this embodiment.

As shown in FIG. 11, in the screen of confirming participation in PAN, the name of the PAN that the participation is confirmed and the name of the organizer of the conference that the PAN is used (i.e., the apparatus name of the main client apparatus 3) are included. After displaying the screen of confirming participation in PAN, "yes" button is pressed by user operation of the client apparatus 3 in case of allowing to join the PAN, and "no" button is pressed by user operation of the client apparatus 3 in case of rejecting participation in the PAN. The content of the user operation is input into the information acquisition unit 131 via the operation display controller 104 of the image forming apparatus 1.

The PAN manager 136 waits (NO in S905) until conformation of participation is acquired from all client apparatuses 3 that transferred the confirmation of participation in PAN. After obtaining confirmation of participation from all client apparatuses 3 (YES in S905), the PAN manager 136 generates PAN information in S906.

Figure 12:
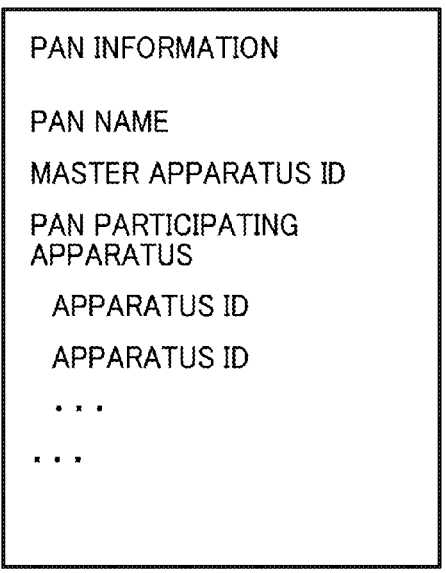
FIG. 12 is a diagram illustrating PAN information generated by a PAN manager as an embodiment of the present invention.

FIG. 12 is a diagram illustrating PAN information generated by a PAN manager in this embodiment. As shown in FIG. 12, the PAN information includes information such as "PAN name", "main apparatus ID", and "PAN participating apparatus" etc. The PAN name is a generated PAN name and input on the new PAN construction screen shown in FIG. 10. The main apparatus ID is an apparatus ID of the main client apparatus 3 in the generated PAN. The PAN participating apparatus is information indicating a list of client apparatuses 3 that construct the PAN such as a list of apparatus IDs.

After generating the PAN information, the PAN manager 136 outputs information of the image forming apparatus 1 such as the MFP ID and MFP name etc. and information on the generated PAN to the network management server 2 in S907. As a result, the network management server 2 generates a PAN ID to identify the PAN information input from the PAN manager 136, transfers the generated PAN ID to the image forming apparatus 1, and stores the PAN information.

Figure 13:
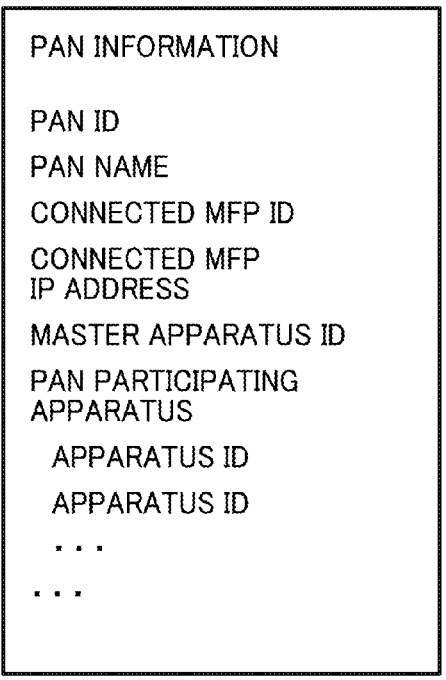
FIG. 13 is a diagram illustrating PAN information stored in the network management server as an embodiment of the present invention.

FIG. 13 is a diagram illustrating the PAN information stored in the network management server 2 in this embodiment. As shown in FIG. 13, in addition to the PAN information shown in FIG. 12, the PAN information includes information such as "PAN ID", "connected MFP ID", and "connected MFP IP address" etc. The connected MFP ID is the MFP ID input from the PAN manager 136, i.e., the MFP ID of the image forming apparatus 1 connected to the client apparatuses 3 included in the PAN via WiFi-VPN shown in FIG. 6. The connected MFP IP address is the MFP name input from the PAN manager 136, i.e., the MFP IP address of the image forming apparatus 1 connected to the client apparatuses 3 included in the PAN via WiFi-VPN shown in FIG. 6.

The PAN manager 136 that transfers the PAN information etc. obtains the PAN ID transferred by the network management server 2 in S908. The PAN manager 136 that obtained the PAN ID adds the obtained PAN ID to the generated PAN information and stores the added data in the PAN information storage unit 137 in S909. As a result, the PAN information storage unit 137 stores the information that the PAN ID is added to the PAN information shown in FIG. 12 as the PAN information.

Figure 14:
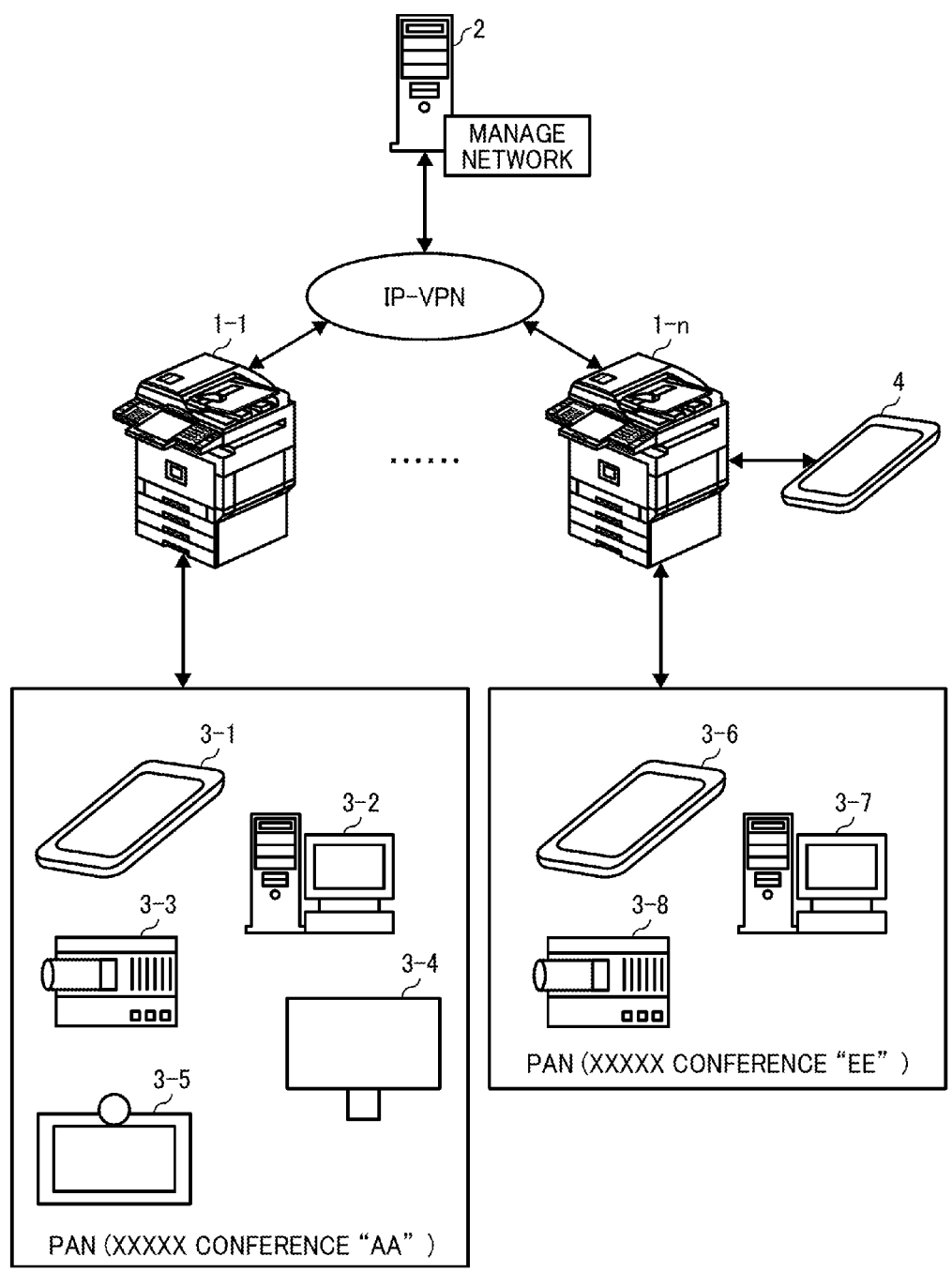
FIG. 14 is a diagram illustrating a network system as an embodiment of the present invention.

FIG. 14 is a diagram illustrating a network system including the PAN constructed by the operation shown in FIG. 9 in this embodiment. As shown in FIG. 14, for example, on the image forming apparatus 1-1, a PAN whose PAN name is "XXXXX conference "AA"" is constructed. For example, the PAN includes client apparatuses 3 such as a tablet device 3-1, PC 3-2, projector 3-3, electronic whiteboard 3-4, and videoconference apparatus 3-5 etc. connected to the image forming apparatus 1-1 via WiFi-VPN. The client apparatuses 3 included in the PAN are connected to be communicable with each other via WiFi-VPN.

In addition, as shown in FIG. 14, for example, on the image forming apparatus 1-n, a PAN whose PAN name is "XXXXX conference "EE"" is constructed. For example, the PAN includes client apparatuses 3 such as a tablet device 3-6, PC 3-7, and projector 3-8 etc. connected to the image forming apparatus 1-n via WiFi-VPN. The client apparatuses 3 included in the PAN are connected to be communicable with each other via WiFi-VPN.

That is, the PAN manager 136 functions as a wireless communication network establishment unit that establishes a wireless communication network (i.e., PAN) that the image forming apparatus 1 and the client apparatus 3 connected via wireless WiFi-VPN to be communicable with each other. In FIG. 14, a case that one PAN is constructed for each of the image forming apparatuses 1-1 to 1-n. However, this is just an example, and it is possible to construct multiple PANs for one image forming apparatus 1.

In addition, the operation of constructing the new PAN is described in FIG. 9. Other than that, the PAN manager 136 adds the client apparatus 3 to the constructed PAN and deletes the client apparatus 3 from the constructed PAN. In case of adding the client apparatus 3 to the PAN, the PAN manager 136 adds the apparatus ID of the client apparatus to be added to the PAN information stored in the PAN information storage unit 137. By contrast, in case of deleting the client apparatus 3 from the PAN, the PAN manager 136 deletes the apparatus ID of the client apparatus 3 to be deleted included in the PAN information stored in the PAN information storage unit 137.

The PAN manager 136 also reflects the updated PAN information by adding and deleting the client apparatus 3 on the PAN information stored in the network management server 2. In addition, in case of releasing the PAN, the PAN manager 136 deletes the PAN information stored in the PAN information storage unit 137 and the network management server 2.

Now, the description goes back to FIG. 4. The integrated PAN manager 138 manages an integrated PAN that multiple different PANs are integrated in accordance with a request from the client apparatus 3. More specifically, the integrated PAN manager 138 integrates existing PANs into a new integrated PAN, adds a PAN to the integrated PAN, deletes a PAN from the integrated PAN, and releases the integrated PAN.

Figure 15:
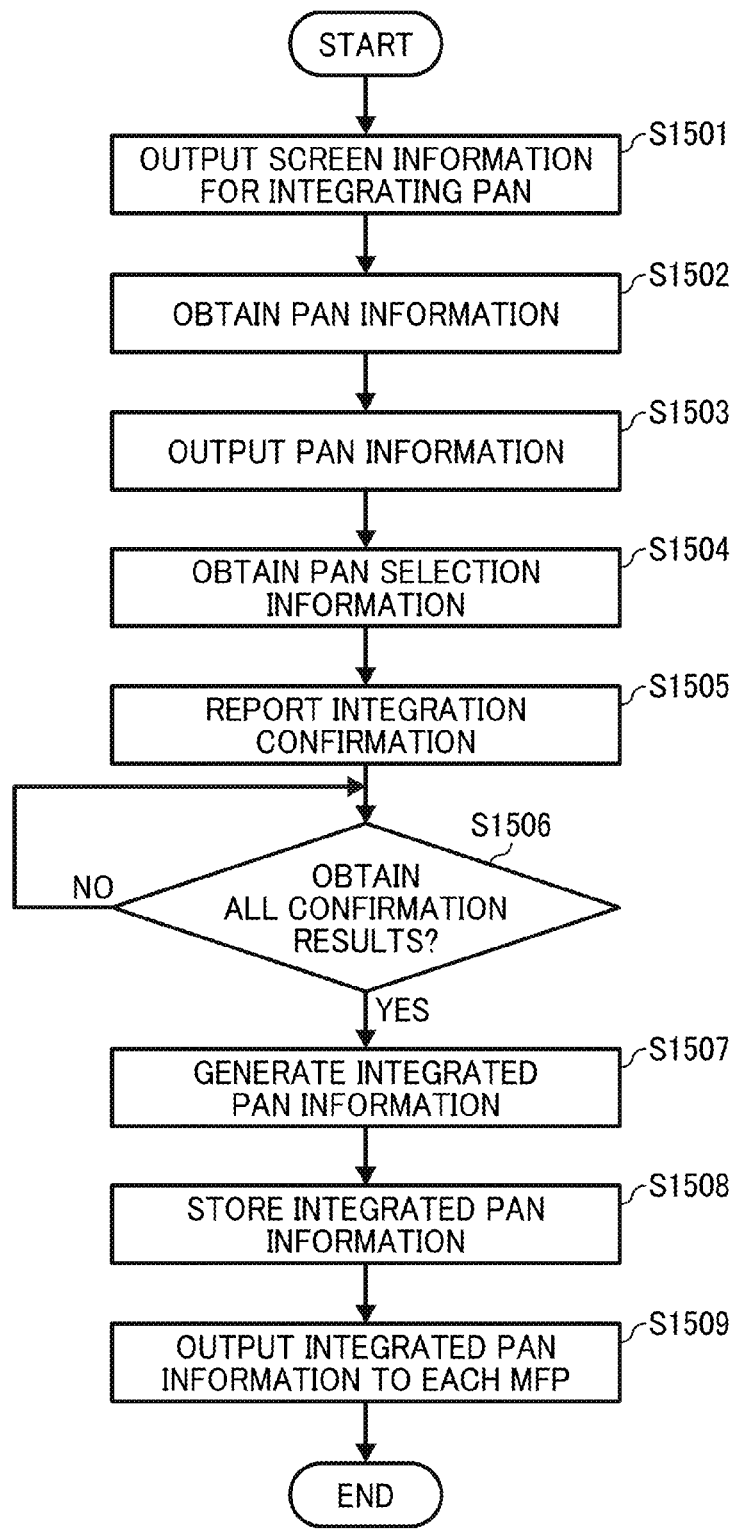
FIG. 15 is a flowchart illustrating an operation of integrating PANs as an embodiment of the present invention.

FIG. 15 is a flowchart illustrating an operation of integrating PANs by the integrated PAN manager 138 in this embodiment. An operation of integrating PANs starts after selecting a menu of integrating PANs from a menu screen of a dedicated application installed in the client apparatus 3 by user operation. For example, the selection of the menu of integrating PANs is performed on the client apparatus 3 used by an organizer of the conference that the integrated PAN is used (i.e., the main client apparatus 3).

As shown in FIG. 15, the integrated PAN manager 138 generates information for displaying a screen of integrating PANs and outputs the generated information to the main client apparatus 3 in S1501. As a result, the screen of integrating PANs is displayed on the LCD 60 of the main client apparatus 3.

FIG. 16 is a diagram illustrating a screen of integrating PANs in this embodiment. As shown in FIG. 16, in the PAN integration screen, a text box to input a name of the integrated PAN, a text box for searching for a PAN, a list of names of the selectable PANs, and a list of names of the selected PANs are included.

The list of names of the selectable PANs is a search result based on information input into the text box for searching for a PAN. After inputting a string (e.g., "XXXXXX conference") to search for a PAN into the text box for searching for a PAN, "search" button is pressed by user operation of the main client apparatus 3. As a result, the information on the input string is input into the information acquisition unit 131 via the operation display controller 104 of the image forming apparatus 1.

Now, the description goes back to FIG. 15. The integrated PAN manager 138 obtains the PAN information from the network management server 2 based on the string information obtained by the information acquisition unit 131 in S1502. More specifically, for example, the integrated PAN manager 138 obtains the PAN information including the string acquired by the information acquisition unit 131 (e.g., "XXXXX conference") among PAN information stored in the network management server 2.

After obtaining the PAN information, the integrated PAN manager 138 outputs information on "PAN name" in the acquired PAN information to the main client apparatus 3 in S1503. As a result, a list of information on "PAN name" input from the PAN manager 136 is displayed in the area where the list of names of selectable PANs in FIG. 16 is displayed. For example, in FIG. 16, the list of PAN names including "XXXXX conference" is displayed.

After selecting a PAN name among the list of names of the selectable PANs in the PAN integration screen in FIG. 16, "add" button is pressed by user operation of the main client apparatus 3. As a result, the selected PAN name is added to the list of selected PAN names. In case of selecting a PAN name among the list of selected PAN names and pressing "delete" button by user operation of the main client apparatus 3, the PAN name of the selected client apparatus 3 is deleted from the list of selected PAN names.

After finishing selecting the PAN name, the OK button is pressed by user operation of the main client apparatus 3. As a result, the selected PAN name is input into the information acquisition unit 131 via the operation display controller 104 of the image forming apparatus 1 as the information on the selected PAN.

Consequently, the PAN manager 136 obtains the PAN selection information in S1504. After obtaining the PAN selection information, the integrated PAN manager 138 reports a confirmation of integrating PAN to the PAN whose PAN name is included in the obtained PAN selection information in S1505. More specifically, for example, the integrated PAN manager 138 reports the PAN name and the confirmation of integrating PAN to the integrated PAN manager 138 in the image forming apparatus 1 identified by "connected MFP ID" included in the PAN information of the PAN name included in the obtained PAN selection information.

After receiving the PAN name and the confirmation of integrating PAN, the integrated PAN manager 138 obtains PAN information including the received PAN name among PAN information stored in the PAN information storage unit 137. Subsequently, after receiving the confirmation of integrating PAN, the integrated PAN manager 138 reports the confirmation of integrating PAN to the client apparatus 3 identified by "main apparatus ID" included in the obtained PAN information.

FIG. 17 is a diagram illustrating a screen of confirming integrating PAN displayed on the LCD 60 of the client apparatus 3 that the confirmation of integrating PAN is notified in S1505 in this embodiment. As shown in FIG. 17, in the screen of confirming integrating PAN, the name of the integrated PAN and the name of the organizer of the conference that the integrated PAN is used (i.e., the apparatus name of the main client apparatus 3 of the integrated PAN) are included. After displaying the screen of confirming integration PAN, "yes" button is pressed by user operation of the client apparatus 3 in case of allowing to integrating PANs, and "no" button is pressed by user operation of the client apparatus 3 in case of rejecting integrating PANs. The content of the user operation is input into the information acquisition unit 131 via the operation display controller 104 of the image forming apparatus 1.

The integrated PAN manager 138 waits (NO in S1506) until conformation of integrating PAN is acquired from all PANs that transferred the confirmation of integrating PAN. After obtaining confirmation of integration from all PANs (YES in S1506), the integrated PAN manager 138 generates integrated PAN information in S1507.

FIG. 18 is a diagram illustrating the integrated PAN information generated by the integrated PAN manager 138 in this embodiment. As shown in FIG. 18, the integrated PAN information includes information such as "integrated PAN ID", "integrated PAN name", "main apparatus ID", and "integrated PAN information" etc. The integrated PAN ID is an identifier that identifies the integrated PAN. The integrated PAN name is a name of the integrated PAN and input on the screen for integrating PANs shown in FIG. 16. The main apparatus ID is an apparatus ID of the main client apparatus 3 in the integrated PAN. The integrated PAN information is information indicating a list of integrated PANs and a list of PAN IDs for example.

After generating the integrated PAN information, the integrated PAN manager 138 stores the generated integrated PAN information in the integrated PAN information storage unit 139 in S1508. The integrated PAN information storage unit 139 stores the integrated PAN information shown in FIG. 18. After storing the integrated PAN information in the integrated PAN information storage unit 139, the integrated PAN manager 138 outputs the generated integrated PAN information to each image forming apparatus 1 (i.e., MFP) identified by "connected MFP ID" included in each PAN information of the integrated PANs in S1509. As a result, after inputting the integrated PAN information, the integrated PAN manager 138 in each image forming apparatus 1 stores the input integrated PAN information in the integrated PAN information storage unit 139. There is no limitation of context in the operations in S1508 and S1509. It is possible to perform the operations in reversed order, and it is also possible to perform the operations in parallel.

Figure 19:
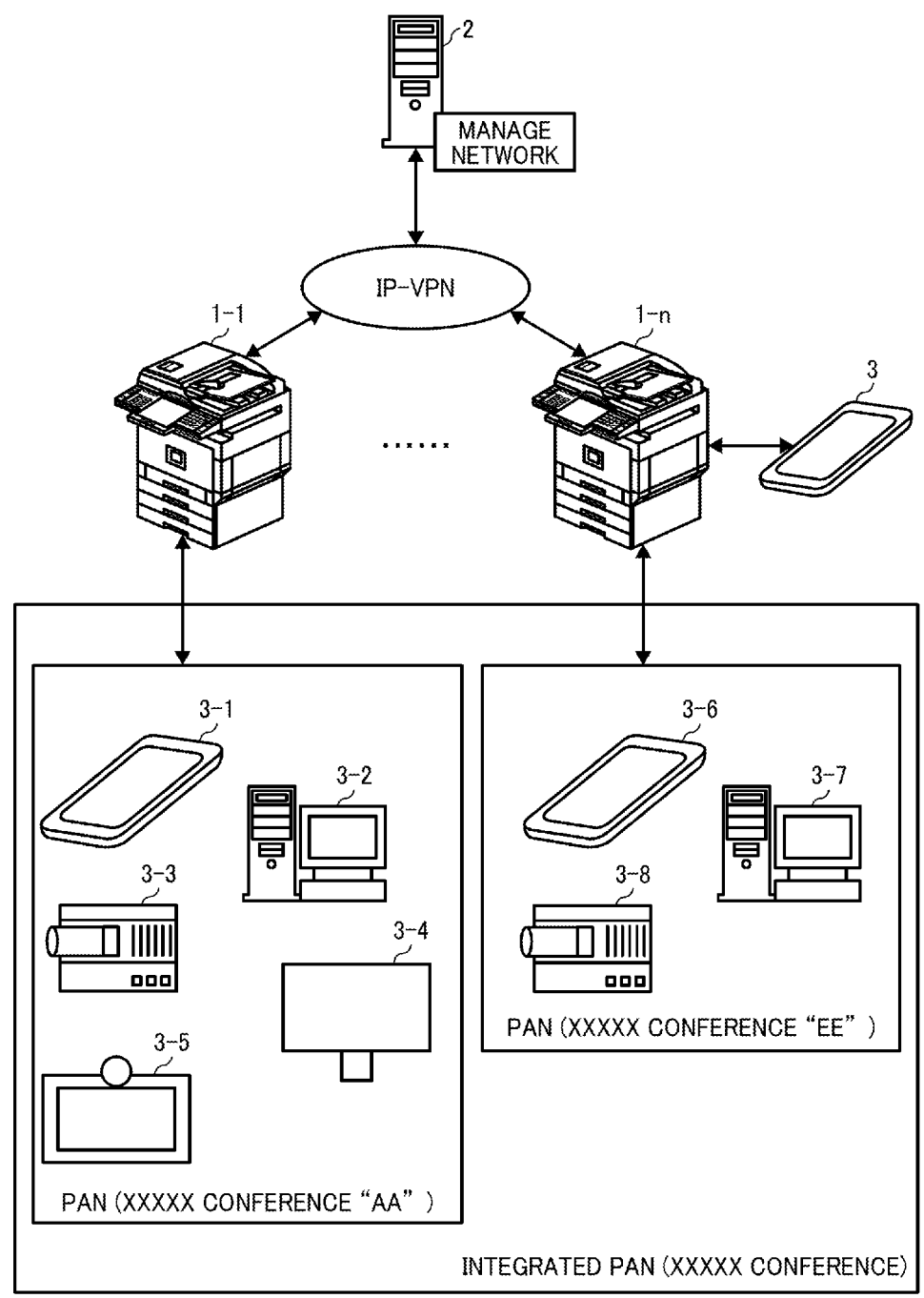
FIG. 19 is a diagram illustrating a network system as an embodiment of the present invention.

FIG. 19 is a diagram illustrating a network system including the integrated PANs integrated by the operation shown in FIG. 15 in this embodiment. As shown in FIG. 19, for example, the PAN of the image forming apparatus 1-1 (i.e., XXXXX conference "AA") is integrated with the PAN of the image forming apparatus 1-n (i.e., XXXXX conference "EE") to construct an integrated PAN (i.e., XXXXX conference). These PANs included in the integrated PAN is communicable with each other via the MFP connected to each PAN. That is, the integrated PAN manager 138 functions as a wireless communication integration unit that integrates wireless communication network (i.e., integrated PAN) that the client apparatuses 3 to be communicable in each of the multiple wireless communication networks (i.e., PANs) are to be communicable with each other.

In addition, the operation of integrating PANs is described in FIG. 15. Other than that, the integrated PAN manager 138 adds the PAN to the integrated PAN and deletes the PAN from the integrated PAN. In case of adding a PAN to the integrated PAN, the integrated PAN manager 138 adds the PAN ID of the PAN to be added to the integrated PAN information stored in the integrated PAN information storage unit 139. By contrast, in case of deleting the PAN from the integrated PAN, the integrated PAN manager 138 deletes the PAN ID of the PAN to be deleted included in the integrated PAN information stored in the integrated PAN information storage unit 139.

The integrated PAN manager 138 also reflects the updated integrated PAN information by adding and deleting the PAN on the integrated PAN information stored in the integrated PAN information storage unit 139 in the other image forming apparatuses 1. In addition, in case of releasing the integrated PAN, the integrated PAN manager 138 deletes the integrated PAN information stored in the integrated PAN information storage unit 139 in the image forming apparatus 1 and the other image forming apparatuses 1.

Now, the description goes back to FIG. 4. The conference manager 140 manages operations at a conference that uses a PAN or integrated PAN in accordance with a request from the client apparatus 3. In describing the operation of the conference manager 140, one PAN and integrated PAN are referred to as "PAN" as a whole. More specifically, the conference manager 140 forms an image on a material shared at a conference using a PAN, distributes the material, and forms an image based on information on writing and deleting data in the distributed material. That is, the conference manager 140 functions as a shared data processor that processes shared data shared by the client apparatuses 3 connected to be communicable with each other in a wireless communication network.

For example, a conference material is created using an application installed in the client apparatus 3 by user operation. That is, the created conference material is shared data to be displayed on the display unit such as the LCD 60 of the client apparatus 3 etc. In case of sharing the created conference material with other client apparatuses 3 included in the PAN, it is required that the application used for creating the conference material is installed in other client apparatuses 3.

Figure 20:
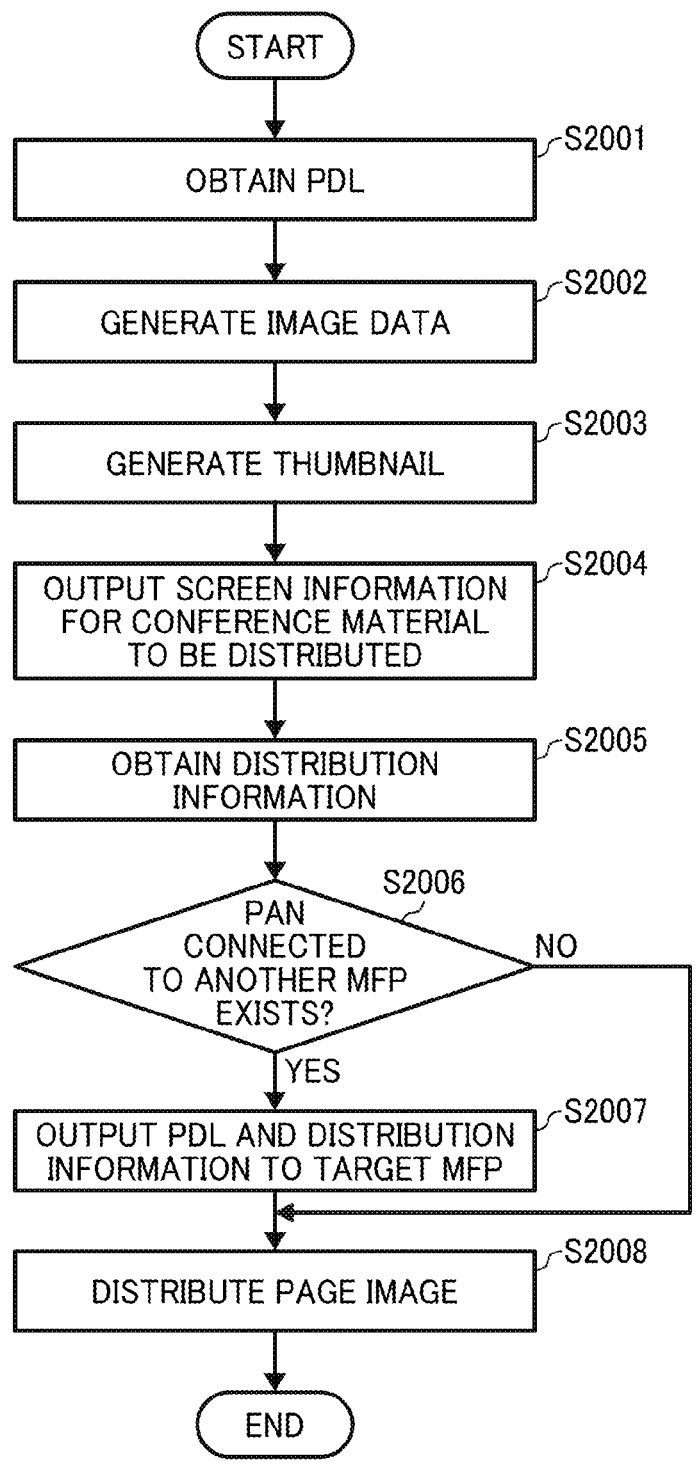
FIG. 20 is a flowchart illustrating an operation of generating and distributing image data of a conference material as an embodiment of the present invention.

In this case, the conference manager 140 generates image data from the created conference material and distributes the generated image data to other client apparatuses 3 included in the PAN. FIG. 20 is a flowchart illustrating an operation of generating and distributing image data of the conference material by the conference manager 140 in this embodiment. The operation of generating and distributing image data of the conference material starts after specifying the operation of distributing the created conference material using a printer driver for PAN by using client apparatus 3 by user operation. The printer driver for PAN is a dedicated driver installed in registering the apparatus information of the client apparatus 3 in the network management server 2 for example.

As shown in FIG. 20, the conference manager 140 obtains a page description language (PDL) generated from information on the image of the conference material by the printer driver for PAN in S2001. After obtaining the PDL, the conference manager 140 generates image data for each page of the conference material based on the obtained PDL in S2002 and stores the generated image data in the image data storage unit 141.

After generating image data for each page, the conference manager 140 generates a thumbnail of the generated image data for each page in S2003 and stores the generated thumbnail in the image data storage unit 141. Here, in case of distributing the conference material to the other client apparatus 3, a menu of distributing the conference material is selected from a menu screen of a dedicated application installed in the client apparatus 3 by using the client apparatus 3 by user operation.

After selecting the menu of distributing the conference material, the conference manager 140 outputs screen information for distributing conference material in S2004. The screen information for distributing conference material includes the generated thumbnail of each page and the apparatus information of the client apparatus 3 included in the PAN (or integrated PAN) including the client apparatus 3 that selected the menu of distribution. It should be noted that the conference manager 140 requests the network management server 2 to obtain the apparatus information of the client apparatus 3 included in the PAN.

Figure 21:
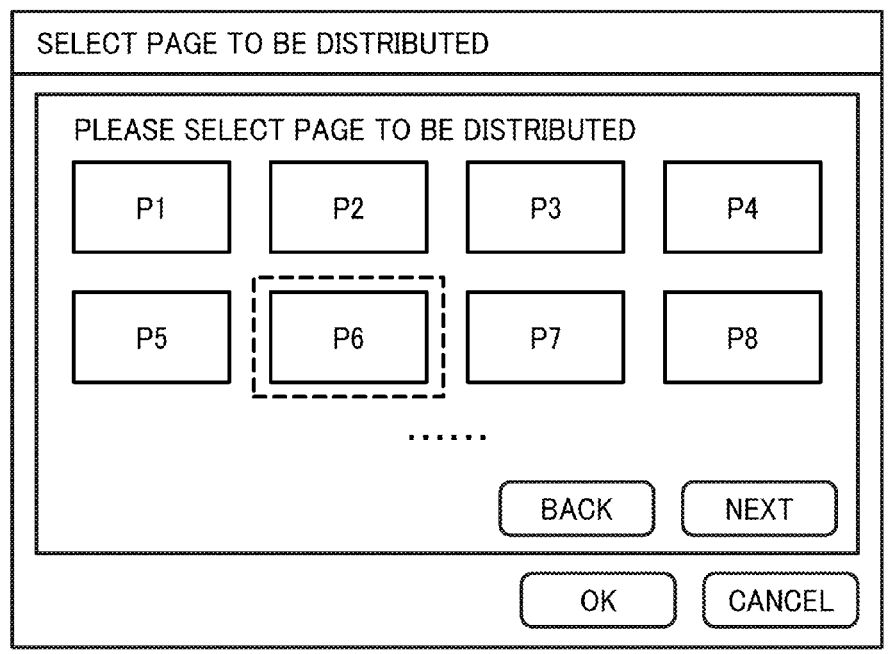
FIG. 21 is a diagram illustrating a screen of selecting a page to be distributed as an embodiment of the present invention.

As a result, a screen of selecting distributed page for selecting a page to be distributed is displayed on the LCD 60 of the client apparatus 3. FIG. 21 is a diagram illustrating the screen of selecting distributed page in this embodiment. As shown in FIG. 21, in the screen of selecting distributed page, a thumbnail of each page of the conference material transferred by the conference manager 140, and the displayed image is switched into a thumbnail of next page by pressing "next" button. After selecting a page to be distributed to other client apparatus 3 from the thumbnail images on the client apparatus 3 by user operation, "OK" button is pressed.

Figure 22:
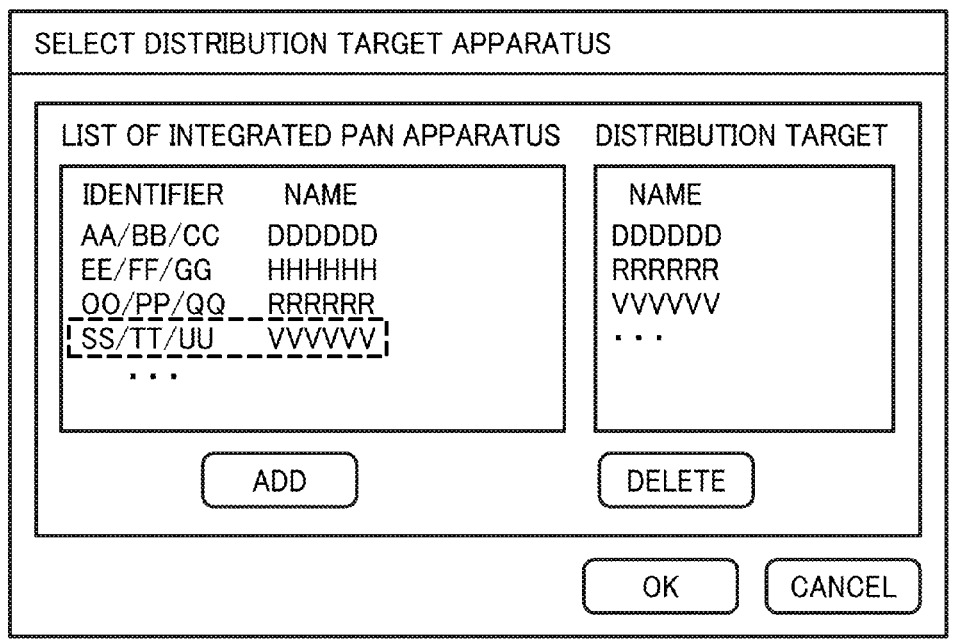
FIG. 22 is a diagram illustrating a screen of selecting a distribution target apparatus as an embodiment of the present invention.

After pressing "OK" button on the screen of selecting distributed page, the client apparatus 3 switches the screen of the LCD 60 into a screen of selecting an apparatus as a destination of distribution. FIG. 22 is a diagram illustrating a screen of selecting a distribution target apparatus in this embodiment. As shown in FIG. 22, in the screen of selecting an apparatus as a destination of distribution, a list of apparatus information of the client apparatus 3 included in the PAN (or integrated PAN) and a list of apparatus names of the client apparatus 3 as a destination of distribution are included.

After selecting apparatus information among the list of apparatus information of the selectable client apparatus 3, "add" button is pressed by user operation. As a result, the apparatus name of the selected client apparatus 3 is added to a list of apparatus names as destination of distribution. In case of selecting an apparatus name from the list of selected apparatus names and pressing "delete" button by user operation, the apparatus name of the selected client apparatus 3 is deleted from the list of apparatus names as the destination of distribution.

After finishing selecting the client apparatus 3 as the destination of distribution by user operation, "OK" button is pressed. As a result, information on a page number to be distributed and the apparatus information of the client apparatus 3 as the destination of distribution selected in the screen in FIG. 21 are regarded as distribution information and input into the information acquisition unit 131 via the communication controller 102 of the image forming apparatus 1.

The conference manager 140 obtains the distribution information from the information acquisition unit 131 in S2005. After obtaining the distribution information, the conference manager 140 determines whether or not a PAN that connects to another image forming apparatus 1 exists among PANs including the client apparatus 3 as the destination of distribution included in the distribution information in S2006. If there is a PAN that connects to the other image forming apparatus 1 (YES in S2006), the conference manager 140 outputs the PDL obtained in S2001 and the distribution information to the other image forming apparatus 1 in S2007.

After outputting the PDL and the distribution information to the other image forming apparatus 1, the conference manager 140 distributes image data of a page to be distributed based on the distribution information to the client apparatus 3 as the destination of distribution included in the PAN connected to its own image forming apparatus 1 in S2008. More specifically, the conference manager 140 distributes image data of a page number to be distributed included in the distribution information among image data for each page stored in the image data storage unit 141 to the client apparatus 3 as the destination of distribution included in the distribution information.

By contrast, if there is no PAN that connects to the other image forming apparatus 1 (NO in S2006), the conference manager 140 does not output the PDL etc. to the other image forming apparatus 1, and the step proceeds to S2008. In addition, the conference manager 140 in the other image forming apparatus 1 that the PDL and the distribution information are input generates image data for each page based on the input PDL and performs the same operation as in S2008. As a result, the image of the conference material at the page to be distributed is displayed on the LCD 60 of the client apparatus 30 as the destination of distribution, and it is possible to share the conference material with the client apparatus 3 included in the PAN.

Figure 23:
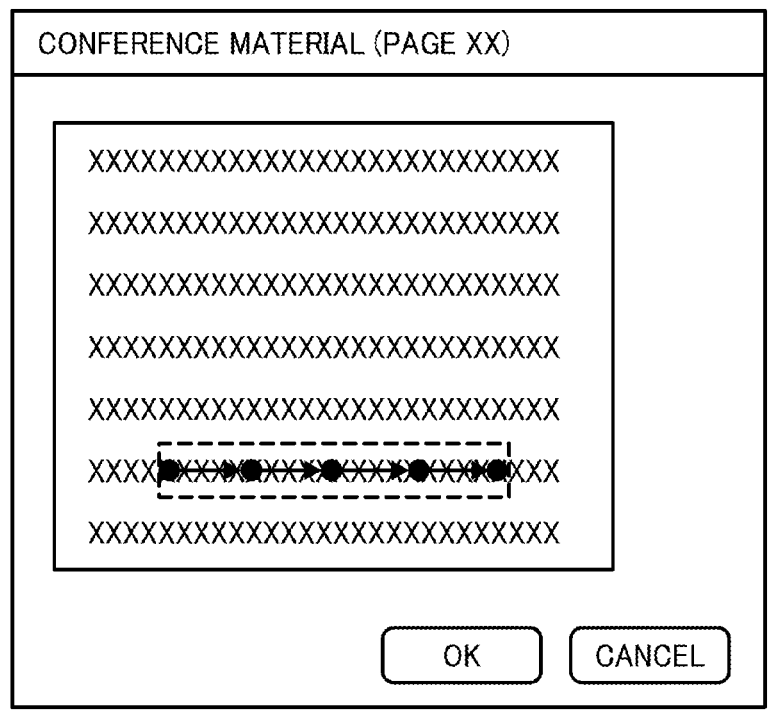
FIG. 23 is a diagram illustrating a screen of a conference material as an embodiment of the present invention.

Furthermore, if something is written on the image displayed on the LCD 60 using a finger or a touch pen by user operation on any one of the client apparatuses 3, the conference manager 140 reflects the written content on the image displayed on the other client apparatuses 3. FIG. 23 is a diagram illustrating a screen of a conference material displayed on the LCD 60 of the client apparatus 3 that shares the conference material in this embodiment.

If the image displayed on the screen in FIG. 23 is traced using a finger etc. by user operation, a dedicated application installed on the client apparatus 3 obtains coordinates of a position where the finger touches the screen, coordinates of a position where the finger leaves the screen, and coordinates between those coordinates periodically. The dedicated application draws a trace of the image using the finger etc. as the written content on the image based on the drawing information.

Figure 24:
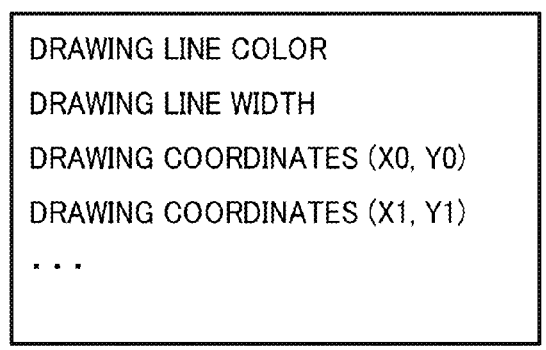
FIG. 24 is a diagram illustrating drawing information as an embodiment of the present invention.

FIG. 24 is a diagram illustrating the drawing information in this embodiment. As shown in FIG. 24, the drawing information includes "drawing line color", "drawing line width", and "drawing coordinates" etc. The drawing line color is information indicating a color of a line that draws the written content on the image. The drawing line width is information indicating a width of a line that draws the written content on the image. The drawing coordinates are coordinates indicating a written position that the dedicated application obtains.

The dedicated application draws a written image on the image that the conference material is displayed at the position indicated by the drawing coordinates included in the drawing information in FIG. 24 using the color indicated by the drawing line color and the line width indicated by the drawing line width. In addition, the dedicated application transfers the drawing information to the image forming apparatus 1 connected to the PAN that includes the client apparatus 3 on which the dedicated application is installed.

After receiving the drawing information from the client apparatus 3, the conference manager 140 in the image forming apparatus 1 outputs the received drawing information to the client apparatus 3 to which the page image is distributed by the operation shown in FIG. 20. As a result, it is possible to reflect the written content on the image of the conference material displayed on any one of the client apparatuses 3 on the image of the conference material displayed on the other client apparatuses 3.

In this embodiment, the case that reflects the written content on the image of the conference material is described as an example. In other cases, if a specified area on the image of the conference material is deleted by user operation on any one of the client apparatuses 3, it is possible to reflect the deleted content of the image on the image of the conference material displayed on the other client apparatuses 3. In this case, the dedicated application transfers area information specified as the deleted area to the image forming apparatus 1 connected to the PAN including the client apparatus 3 itself.

After receiving the area information, the conference manager 140 in the image forming apparatus 1 outputs the received area information to the client apparatus 3 to which the page image is distributed by the operation shown in FIG. 20. In this case, the area information is the drawing information that draws an image to delete the image included in the specified area (i.e., paint the image included in the specified area in white for example). That is, the drawing image is information for drawing an image in accordance with an operation of adding and deleting information on an image.

Now, the description goes back to FIG. 4. In accordance with a request from the client apparatus 3, the MFP executor 142 executes various functions included in the image forming apparatus 1 such as printing function and scanning function etc. and charges fee to the client apparatus 3 that uses the function of the image forming apparatus 1. That is, the MFP executor 142 functions as an image forming processor that forms an image in accordance with the request from the client apparatus 3.

Figure 25:
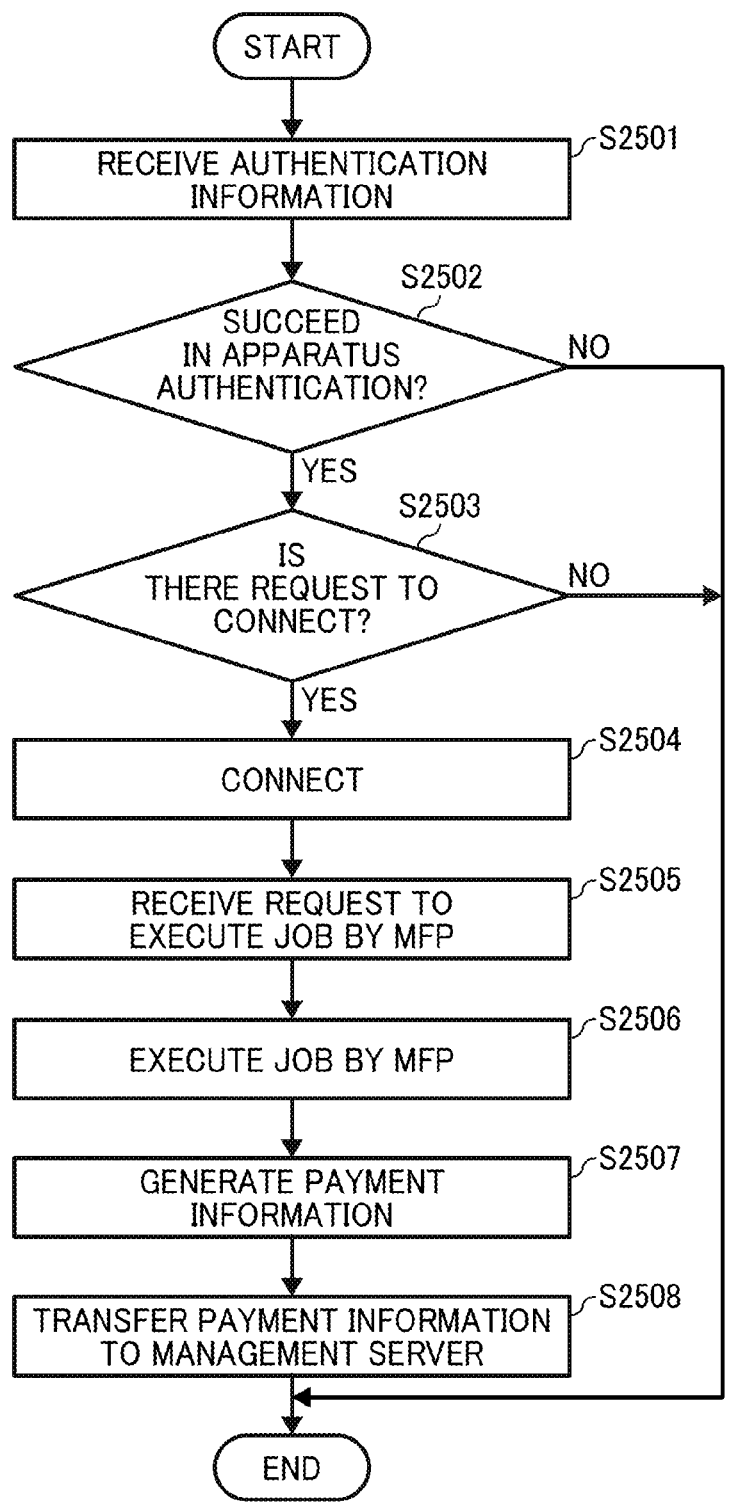
FIG. 25 is a flowchart illustrating an operation by a MFP executor as an embodiment of the present invention.

FIG. 25 is a flowchart illustrating an operation by the MFP executor 142 in this embodiment. In the operation shown in FIG. 25, the client apparatus 3 that has not been connected to the image forming apparatus 1 using WiFi-VPN requests execution to the image forming apparatus 1 for example. The operation in the flowchart shown in FIG.

25 starts after selecting a menu of executing MFP on a menu screen of the dedicated application installed on the client apparatus 3.

After selecting the menu of executing MFP, the client apparatus 3 transfers authentication information to the MFP executor 142 in the image forming apparatus 1 that establishes communication with the client apparatus 3 in infrastructure mode in S2501. The authentication information is the same as the authentication information that the client apparatus manager 134 described above receives in connecting with the client apparatus 3 using WiFi-VPN connection.

After receiving the authentication information, the MFP executor 142 transfers the received authentication information to the network management server 2 and determines whether or not the authentication result based on the authentication information received from the network management server 2 indicates success of authentication in S2502. The operation of authentication performed by the client apparatus 3 based on the authentication information provided by the network management server 2 is the same as the operation of authentication when the image forming apparatus 1 connects to the client apparatus 3 described above.

If the authentication result indicates that the authentication failed (NO in S2502), the MFP executor 142 does not perform operations, and the operation ends. By contrast, if the authentication result indicates that the authentication succeeded (YES in S2502), the MFP executor 142 determines whether or not the request for connection is received from the client apparatus 3 in S2503.

On the client apparatus 3, just like the case that the client apparatus 3 is connected to the image forming apparatus 1 described above, the image forming apparatus 1 to be used is selected by user operation among the image forming apparatuses 1 that reported the authentication result indicating that the authentication succeeded. As a result, the client apparatus 3 transfers the request for connection to the image forming apparatus 1 selected by user operation.

If the request for connection is not received (NO in S2503), the MFP executor 142 does not perform operations, and the operation ends. By contrast, if the request for connection is received (YES in S2503), the MFP executor 142 connects with the client apparatus 3 that transferred the request for connection using WiFi-VPN in S2504.

The MFP executor 142 included in the image forming apparatus 1 that connects with the client apparatus 3 using WiFi-VPN receives a request to execute MFP (e.g., a request to print etc.) from the client apparatus 3 in S2505. After receiving the request to execute MFP, the MFP executor 142 performs an operation (e.g., printing etc.) in accordance with the received request to execute MFP in S2506.

Figure 26:
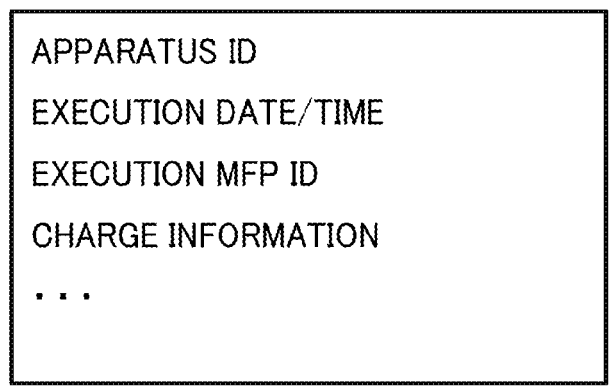
FIG. 26 is a diagram illustrating charging information as an embodiment of the present invention.

After performing the operation, the MFP executor 142 generates charging information in accordance with the performed operation in S2507. FIG. 26 is a diagram illustrating the charging information in this embodiment. As shown in FIG. 26, the charging information includes "apparatus ID", "execution date/time", "execution MFP ID", and "charging information" etc. The apparatus ID is an identifier to identify the client apparatus 3 that transferred the request to execute MFP. The execution date/time is information indicating date/time when the operation is executed.

The execution MFP ID is an identifier to identify the image forming apparatus 1 that executed the operation. The charging information is information indicating a fee charged for the operation executed by the image forming apparatus 1. For example, a fee for printing is calculated from the number of printed sheets, printing size, and printing conditions etc.

After generating the charging information, the MFP executor 142 transfers the generated charging information to the network management server 2 in S2508. The network management server 2 manages the charging information for each of the client apparatus 3. For example, the network management server 2 reports an usage fee of the image forming apparatus 1 to the client apparatus 3 by user notification for each month.

In this embodiment, before the client apparatus 3 connects with the image forming apparatus 1 using WiFi-VPN, the case that the client apparatus 3 transfers the request to execute MFP is described as an example. Otherwise, it is possible that the client apparatus 3 transfers the request to execute MFP after the client apparatus 3 connects with the image forming apparatus 1 using WiFi-VPN or after the PAN is constructed. In this case, the MFP executor 142 included in the image forming apparatus 1 that connects with the client apparatus 3 using WiFi-VPN executes the operation in accordance with the request from the client apparatus 3 without performing the authentication etc.

As described above, the image forming apparatus 1 in this embodiment connects communication via the virtual private network (VPN) in accordance with the request from the client apparatus 3. Subsequently, the image forming apparatus 1 establishes the PAN as the wireless communication network to be communicable with each other with the client apparatus 3 that connects communication. As a result, it is possible to establish the PAN using the image forming apparatus 1 that is already used in the office etc. without installing a new apparatus. Consequently, it is possible to construct the network considering security reducing a cost of constructing a network between apparatuses used by conference attendees.

In addition, the image forming apparatus 1 in this embodiment generates image data for each page of the conference material and distributes the image data at a specified page to the specified client apparatus 3. As a result, even if Adobe Acrobat that converts the conference material into displayable data (e.g., Portable Document Format (PDF)) is not installed in the client apparatus 3 specified as the distribution destination, it is possible to share the conference material between the client apparatuses 3 included in the PAN. However, the configuration described above is not necessary. Even if the configuration is not implemented, it is possible to construct the network considering security reducing a cost of constructing a network between apparatuses used by conference attendees.

In addition, the image forming apparatus 1 in this embodiment reflects contents written or deleted on an image shared between the client apparatuses 3 included in the PAN on an image shared among all client apparatuses 3 based on drawing information. As a result, it is possible to supply modification by user operation who uses a client apparatus 3.

In addition, by implementing the configuration described above, since it is not required to transfer the image data itself that indicates the written content etc., it is possible to prevent the reflection of the written content etc. from delaying. However, the configuration described above is not necessary. Even if the configuration is not implemented, it is possible to construct the network considering security reducing a cost of constructing a network between apparatuses used by conference attendees.

In addition, the image forming apparatus 1 in this embodiment executes various functions included in the image forming apparatus 1 in accordance with the request from the client apparatus 3. By implementing the configuration described above, since it is possible to print the materials etc. at the corporation where the conference that outside attendees attend is held, it is possible to reduce burden that the conference attendees carry around the materials etc. and prevent from leaking confidential information by losing the materials during the transit.

Furthermore, the image forming apparatus 1 in this embodiment charges a fee to the client apparatus 3 that requested the image forming apparatus 1 to perform the operation. By implementing the configuration described above, it is possible that the outside attendees uses the image forming apparatus 1 without any hesitation. However, the configuration that performs various operations and charges a fee described above is not necessary. Even if the configuration is not implemented, it is possible to construct the network considering security reducing a cost of constructing a network between apparatuses used by conference attendees.

In the embodiments described above, the case that the image forming apparatus 1 connected to the client apparatus 3 using WiFi-VPN is selected by user operation via the selection screen shown in FIG. 7. Other than that, it is also possible that the image forming apparatus 1 connected to the client apparatus 3 using WiFi-VPN is selected in accordance with radio field intensity between the client apparatus 3 and the image forming apparatus 1.

Figure 27:
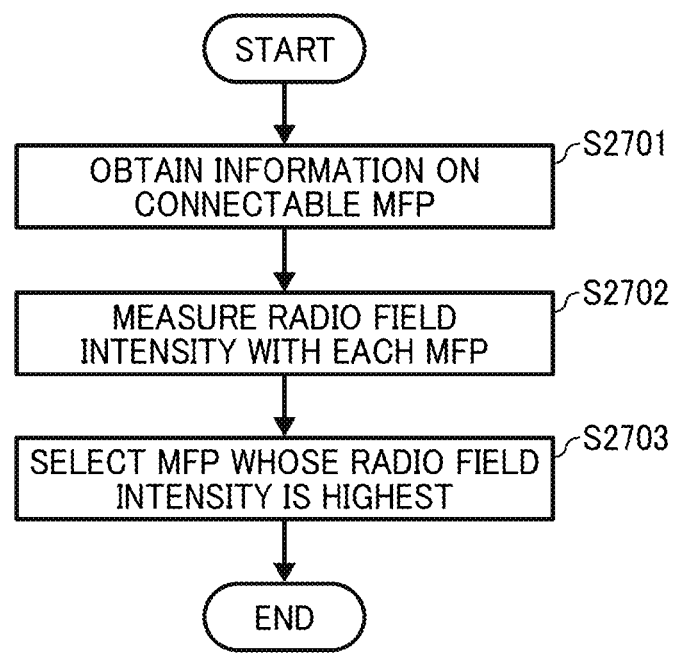
FIG. 27 is a flowchart illustrating an operation of selecting an image forming apparatus by a client apparatus as an embodiment of the present invention.

FIG. 27 is a flowchart illustrating an operation of selecting the image forming apparatus 1 in accordance with the radio field intensity between the client apparatus 3 and the image forming apparatus 1 in this embodiment. As shown in FIG. 27, the client apparatus 3 obtains the apparatus information of the connectible image forming apparatuses 1 in accordance with the authentication results with each of the image forming apparatus 1 described above in S2701.

After obtaining the apparatus information of the connectible image forming apparatuses 1, the client apparatus 3 measures the radio field intensity with each of the connectible image forming apparatuses 1 in S2702. After measuring the radio field intensity, the client apparatus 3 selects the image forming apparatus 1 whose radio field intensity is the strongest in S2703. By implementing the configuration described above, since it is possible to select the image forming apparatus 1 without user operation, it is possible to reduce burden on users.

In addition, in the embodiment described above, the case that the client apparatus 3 that constructs the PAN is selected from a list of apparatus information of the selectable client apparatuses 3 displayed on the new PAN construction screen shown in FIG. 10 is described as an example. Otherwise, it is possible to refine the client apparatuses 3 furthermore from the list of apparatus information of the selectable client apparatuses 3 using information on "the first identifier" to "the third identifier" shown in FIG. 5 included in the apparatus information of the client apparatus 3.

As described above, since the first identifier to the third identifier are information such as the corporation name, division name, and department name identifying organizations in the corporation, it is possible to check the client apparatus 3 for conference attendees in the organization effectively. In addition, by splitting ranges of target to be searched as the first identifier to the third identifier, it is possible to enhance user convenience for searching. In addition, in case of searching for the image forming apparatus 1, it is possible to use the first identifier to the third identifier shown in FIG. 6 similarly.

In addition, in case of sending e-mail from a client apparatus 3 to another client apparatus 3, it is possible to search for the other client apparatus 3 using the first identifier to the third identifier. More specifically, the client apparatus 3 corresponding to the first identifier to the third identifier using the corporation name and division name to which the user who sends the e-mail belongs as a search word. Since the apparatus information of the searched client apparatus 3 includes information on the apparatus address, it is possible to send the e-mail to the destination user using the mail address indicated in the apparatus address.

In addition, in the embodiment described above, the case that the page in the conference material to be distributed is selected by user operation via the screen shown in FIG. 21 is described as an example. Other than that, instead of selecting the page to be distributed by user operation, it is possible that the conference manager 140 distributes image data for all pages to the destination client apparatus 3.

In addition, in the embodiments described above, after selecting the page to be distributed via the screen shown in FIG. 21, the case that the destination client apparatus 3 is selected via the screen shown in FIG. 22 is described as an example. However, it is possible to use a reverse order of selection. In addition, it is possible to select the destination client apparatus 3 only once for one conference material, and it is possible not to select the destination client apparatus 3 in selecting a page to be distributed next time. In addition, it is possible to change the client apparatus 3 to be distributed in accordance with user request. In addition, it is possible not to select the destination client apparatus 3, and it is possible to regard all client apparatuses 3 included in the PAN as the destination.

In addition, it is possible that the conference manager 140 caches distributed page information, and if the distributed page is selected again, it is possible not to distribute the image data of the distributed page to the client apparatus 3. By implementing the configuration described above, it is possible to prevent from exchanging unnecessary data for image data that has already been generated, and it is possible to make the network system more efficient.

In addition, if the constructed PAN is released, it is possible that the conference manager 140 controls the destination client apparatus 3 so that the distributed image data is deleted. By implementing the configuration described above, it is possible to prevent the system from consuming the size of the storage media by retaining the unnecessary image data after finishing the conference, and it is possible to prevent the system from leaking image data including confidence information. In addition, it is possible that the conference manager 140 notifies the user that the image data is to be deleted, and it is possible that the conference manager 140 deletes the image data if it is allowed to delete the image data by user operation.

In the embodiment described above, in the operation shown in FIG. 27, the case that the image forming apparatus 1 whose radio field intensity with the client apparatus 3 is the strongest is selected is described as an example. Other than that, on a screen that displays a list of the image forming apparatuses 1 along with the measure radio field intensity, it is possible to select the image forming apparatus 1 by user operation. In that case, it is possible to display the list of the image forming apparatuses 1 in descending order of radio filed intensity. By implementing the configuration described above, it is possible to select the image forming apparatus to be connected by user operation with reference to the strength of the radio field intensity.

The present invention also encompasses a non-transitory recording medium storing a program that executes an image forming method. The image forming method includes the steps of connecting to one or more first information processing apparatuses via a virtual private network in response to a request to connect from at least one of the one or more first information processing apparatuses and establishing a first wireless communication network among the image forming apparatus and the first information processing apparatuses to enable wireless communication among the image forming apparatus and the first information processing apparatuses.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus, comprising:
   an image forming device to form an image in response to a request for forming the image from at least one of a plurality of first information processing apparatuses; and
   circuitry to:
   connect to one or more of the plurality of first information processing apparatuses via a virtual private network in response to a request to connect from at least one of the one or more of the plurality of first information processing apparatuses;
   send data corresponding to the connected one or more of the plurality of first information processing apparatuses to a main first information processing apparatus;
   receive a set of selected first information processing apparatuses from the main first information processing apparatus including one or more first information processing apparatuses selected to be included in a first wireless communication network;
   establish the first wireless communication network among the image forming apparatus and the set of selected first information processing apparatuses; and
   enable wireless communication among the image forming apparatus and the set of selected first information processing apparatuses via the first wireless communication network.

2. The image forming apparatus according to claim 1, wherein, the circuitry further establishes a second wireless communication network among one or more second information processing apparatuses, and the circuitry integrates the first wireless communication network and the second wireless communication network into an integrated wireless communication network to enable wireless communication among the set of selected first information processing apparatuses and the second information processing apparatuses.

3. The image forming apparatus according to claim 1, wherein a second wireless communication network among one or more second information processing apparatuses is established by a second image forming apparatus different from the image forming apparatus, and the circuitry integrates the first wireless communication network and the second wireless communication network into an integrated wireless communication network to enable wireless communication among the set of selected first information processing apparatuses and the second information processing apparatuses.

4. The image forming apparatus according to claim 1, wherein the circuitry processes shared data to be shared by the set of selected first information processing apparatuses connected with each other in the first wireless communication network.

5. The image forming apparatus according to claim 4, wherein the circuitry generates image data from the shared data, and transfers the generated image data to each one of the set of selected first information processing apparatuses in the first wireless communication network for display at each one of the set of selected first information processing apparatuses.

6. The image forming apparatus according to claim 4, wherein the circuitry further obtains, from at least one of the set of selected first information processing apparatuses, drawing information that reflects a user operation of adding or deleting information on an image displayed on a display of the at least one of the set of selected first information processing apparatus, and transfers the obtained drawing information to the set of selected first information processing apparatuses in the first wireless communication network.

7. The image forming apparatus according to claim 1, wherein the circuitry charges a fee for forming the image to the at least one of the plurality of first information processing apparatuses that requests to form the image.

8. The image forming apparatus according to claim 1, wherein the circuitry connects to each of the one or more of the plurality of first information processing apparatuses to establish the first wireless communication network, when the one or more of the plurality of first information processing apparatuses has a strongest radio field intensity between the image forming apparatus and the one or more of the plurality of first information processing apparatuses.

9. The image forming apparatus according to claim 1, wherein the circuitry includes a processor or controller that executes stored instructions.

10. A method of controlling connection, performed by an image forming apparatus, comprising:
    connecting to one or more first information processing apparatuses via a virtual private network in response to a request to connect from at least one of the one or more first information processing apparatuses;
    sending data corresponding to the connected one or more first information processing apparatuses to a main first information processing apparatus;
    receiving a set of selected first information processing apparatuses from the main first information processing apparatus including one or more first information processing apparatuses selected to be included in a first wireless communication network;

establishing the first wireless communication network among the image forming apparatus and the set of selected first information processing apparatuses; and enabling wireless communication among the image forming apparatus and the set of selected first information processing apparatuses via the first wireless communication network.

11. An image forming system comprising:

an image forming apparatus configured to communicate with another apparatus in a virtual private network; and an operation terminal that accepts user operation to the image forming apparatus, the image forming apparatus including circuitry to:

connect to one or more first information processing apparatuses via a virtual private network in response to a request to connect from at least one of the one or more first information processing apparatuses;

send data corresponding to the connected one or more first information processing apparatuses to a main first information processing apparatus;

receive a set of selected first information processing apparatuses from the main first information processing apparatus including one or more first information processing apparatuses selected to be included in a first wireless communication network;

establish the first wireless communication network among the image forming apparatus and the set of selected first information processing apparatuses; and enable wireless communication among the image forming apparatus and the set of selected first information processing apparatuses via the first wireless communication network.

12. The image forming system according to claim 11, wherein, when the circuitry further establishes a second wireless communication network among one or more second information processing apparatuses, the circuitry integrates the first wireless communication network and the second wireless communication network into an integrated wireless communication network to enable wireless communication among the first information processing apparatuses and the second information processing apparatuses.

13. The image forming system according to claim 11, wherein a second wireless communication network among one or more second information processing apparatuses is established by a second image forming apparatus different from the image forming apparatus, and the circuitry integrates the first wireless communication network and the second wireless communication network into an integrated wireless communication network to enable wireless communication among the set of selected first information processing apparatuses and a second information processing apparatuses.

14. The image forming system according to claim 11, wherein the circuitry processes shared data to be shared by the set of selected first information processing apparatuses connected with each other in the first wireless communication network.

15. The image forming system according to claim 14, wherein the circuitry generates image data from the shared data, and transfers the generated image data to each one of the set of selected first information processing apparatuses in the first wireless communication network for display at each one of the set of selected first information processing apparatuses.

16. The image forming system according to claim 14, wherein the circuitry further obtains, from at least one of the set of selected first information processing apparatuses, drawing information that reflects a user operation of adding or deleting information on an image displayed on a display of the at least one of the set of selected first information processing apparatus, and transfers the obtained drawing information to the set of selected first information processing apparatuses in the first wireless communication network.

17. The image forming system according to claim 11, further comprising:

an image forming device to form an image in response to a request for forming the image from at least one of the first information processing apparatuses, wherein the circuitry charges a fee for forming the image to the at least one of the first information processing apparatuses that requests to form the image.

18. The image forming system according to claim 11, wherein the circuitry connects to each of the one or more first information processing apparatuses to establish the first wireless communication network, when the one or more first information processing apparatuses have a strongest radio field intensity between the image forming apparatus and the one or more first information processing apparatuses.

19. The image forming system according to claim 11, wherein the circuitry includes a processor or controller that executes stored instructions.

* * * * *